(12) United States Patent
Mizuno et al.

(10) Patent No.: US 6,183,144 B1
(45) Date of Patent: Feb. 6, 2001

(54) INSTANT PHOTO FILM PACK

(75) Inventors: Kazunori Mizuno; Nobuo Sugiyama; Tetsuya Takatori; Tomoyuki Takahashi; Koichi Hatakeyama, all of Kanagawa (JP)

(73) Assignee: Fuji Photo Film Co., Ltd., Kangawa (JP)

( * ) Notice: Under 35 U.S.C. 154(b), the term of this patent shall be extended for 0 days.

(21) Appl. No.: 09/369,417

(22) Filed: Aug. 6, 1999

(30) Foreign Application Priority Data

| Aug. 6, 1998 | (JP) | 10-222695 |
| Sep. 4, 1998 | (JP) | 10-250851 |
| Sep. 9, 1998 | (JP) | 10-254722 |

(51) Int. Cl.[7] .................................................. G03B 17/26
(52) U.S. Cl. ......................... 396/518; 396/583; 396/527
(58) Field of Search ............................ 396/34, 527, 583, 396/518; 430/207

(56) References Cited

U.S. PATENT DOCUMENTS 4,546,061 * 10/1985 Ono et al. ............................. 396/583
5,541,683  7/1996 Kihara et al. ............................ 395/34

FOREIGN PATENT DOCUMENTS 7-209814  8/1995 (JP) ................................. G03C/3/00

* cited by examiner

Primary Examiner—D. Rutledge
(74) Attorney, Agent, or Firm—Sughrue, Mion, Zinn, Macpeak & Seas, PLLC

(57) ABSTRACT

An instant photo film pack includes a pack case for containing a stack of ten self-processing photo film units. An outlet slit is formed in the pack case, for exiting an exposed one of the photo film units therethrough. A light-shielding flap has a substantially quadrilateral shape, for closing the outlet slit in a light-tight manner. The light-shielding flap has first, second and third predetermined adhering regions, at least which are coated with adhesive agent and attached to the pack case. The light-shielding flap has first and second longer side lines and first and second shorter side lines. The first adhering region has a linear shape and extends along the first longer side line. The second and third adhering regions have a dot shape, and are disposed respectively at the first and second shorter side lines. The outlet slit is disposed between the second and third adhering regions.

11 Claims, 29 Drawing Sheets

INSTANT PHOTO FILM PACK

BACKGROUND OF THE INVENTION

1. Field of the Invention

The present invention relates to an instant photo film pack. More particularly, the present invention relates to an instant photo film pack in which an outlet slit can be shielded reliably from ambient light.

2. Description Related to the Prior Art

An instant photo film pack for use with an instant camera is known in the field of photosensitive material. JP-A 7-209814 discloses an example of the photo film pack, which is constituted by a pack case of hard plastic shaped as a box, and contains self-processing photo film units of a mono-sheet type. Each of the photo film units includes an exposure portion of a photosensitive sheet, a solution pod and a trap portion. The exposure portion includes a photosensitive layer and a light receiving layer. The solution pod encloses processing solution. The trap portion traps and hardens the surplus part of the processing solution.

There are an exposure opening and an outlet slit in the case of the photo film pack. The outlet slit is formed for exiting of each exposed one of the photo film units. A light-shielding cover sheet of hard plastics is laid on an exposure surface of a first one of the photo film units, and closes the exposure opening to avoid entry of light.

The photo film pack is inserted into a photo film loading chamber of the instant camera. A shutter release button of the instant camera is depressed to take an exposure. In response to this, a claw mechanism, incorporated in the body of the instant camera as well-known in the art, pushes only the exposed one of the photo film units and ejects it through the outlet slit of the photo film pack. The photo film unit is nipped by a set of spreader rollers, and advanced toward a camera outlet of the instant camera. The spreader roller set spreads processing solution on an exposure surface of the photo film unit to develop the photo film unit. At the same time, a succeeding one of the photo film units is shifted forwards and becomes set on the exposure opening.

There is a light-shielding flap or thin sheet of resin attached to the outlet slit of the photo film pack for avoiding entry of ambient light into the photo film pack and fogging of an unexposed one of the photo film units. For attaching the light-shielding flap, adhesive agent is used, an example of which is a hot-melt type for the reason of productivity of the photo film pack.

The light-shielding flap of the prior art is attached by use of a simply straight region of adhesion to the outlet slit of the photo film pack. As the temperature changes from high temperature of hot-melt adhesion to low temperature, wrinkles or shrinkage in the light-shielding flap is likely to occur at the outlet slit. A space or gap may be created with the outlet slit typically at an end of the light-shielding flap. Ambient light may enter through the space of the gap to fog or expose the photo film units.

SUMMARY OF THE INVENTION

In view of the foregoing problems, an object of the present invention is to provide an instant photo film pack in which photo film units can be reliably prevented from being fogged or exposed by ambient light.

In order to achieve the above and other objects and advantages of this invention, an instant photo film pack includes a pack case for containing a stack of plural self-processing photo film units. An outlet slit is formed in the pack case, for exiting an exposed one of the photo film units therethrough. A light-shielding flap has a substantially quadrilateral shape, for closing the outlet slit in a light-tight manner, the light-shielding flap having first, second and third predetermined adhering regions, at least the first, second and third adhering regions being coated with adhesive agent and attached to the pack case. The light-shielding flap has first and second longer side lines and first and second shorter side lines. The first adhering region has a linear shape and extends along the first longer side line. The second and third adhering regions have a dot shape, and are disposed respectively at the first and second shorter side lines, the outlet slit being disposed between the second and third adhering regions.

According to another aspect of the present invention, a light-shielding flap has a predetermined adhering region, at least the adhering region being coated with adhesive agent and attached to the pack case, the light-shielding flap having first and second longer side lines and first and second shorter side lines. The adhering region includes a linear portion disposed to extend along a first longer side line. First and second lateral portions are disposed to extend from ends of the linear portion and along the first and second shorter side lines, the outlet slit being disposed between the first and second lateral portions.

The adhesive agent is hot-melt adhesive agent. The light-shielding flap is attached to the pack case by application of heat to the adhering region.

The first and second lateral portions extend to the second longer side line.

In another preferred embodiment, the first and second lateral portions are disposed away from the second longer side line.

The light-shielding flap is obtained by cutting continuous sheet material coated with the hot-melt adhesive agent at a predetermined size.

The adhering region is pre-coated in a patterned manner with the hot-melt adhesive agent.

In another preferred embodiment, a coating pattern is pre-coated with the hot-melt adhesive agent, and the adhering region is a portion of the coating pattern.

The light-shielding flap is plastic.

According to still another aspect of the present invention, the photo film units include an exposure portion disposed substantially at a center, a processing solution pod, disposed along one of edges, for containing processing solution, and a trap portion, disposed one of the edges opposite to the solution pod with reference to the exposure portion, for trapping and hardening a surplus part of the processing solution spread on the exposure portion. Furthermore, an exposure opening is formed in the pack case, for providing the photo film units with an exposure. First and second support ridges are disposed on an inner wall of the pack case opposite to the exposure opening, extend substantially in parallel with each other, and have a support edge convexly curved at least partially, the support edge contacting a rear of the stack of the photo film units, for positioning the stack on the exposure opening. The support edge includes a first section disposed behind the exposure portion. A second section is disposed behind the solution pod, and curved convexly toward the exposure opening. A third section is disposed behind the trap portion to protrude toward the exposure opening beyond the second section, for preventing one of the photo film units being exited.

The second and third sections satisfy:

R2<R1 where R1 is a radius of the second section, and R2 is a radius of the third section.

The first section is straight.

The exposure portion is substantially quadrilateral, and the solution pod and the trap portion are disposed along shorter side lines of the exposure portion.

The exposure portion is substantially quadrilateral, and the solution pod and the trap portion are disposed along longer side lines of the exposure portion.

According to another aspect of the present invention, an instant photo film pack includes a pack case for containing a stack of plural self-processing photo film units, the pack case having first and second walls disposed in front of and behind the photo film units. An exposure opening is formed in the first wall, for providing a first one of the photo film units with an exposure therethrough. An outlet slit is formed in an end wall of the pack case, extended substantially in parallel with one side line of the exposure opening, for exiting exposed the first photo film unit therethrough. First and second shifting projections are disposed between the exposure opening and the outlet slit to project from an inner face of the first wall, positioned close to first and second ends of the outlet slit, for pushing and deforming first and second lateral edges of the first photo film unit. First and second recesses are formed to retreat from the outlet slit by spreading the first and second ends toward the second wall, for allowing passage of the first and second lateral edges deformed in the outlet slit.

Furthermore, at least one resilient sheet is disposed between the second wall and the photo film units, for keeping the first photo film unit flat at the exposure opening by pressing the stack of the photo film units. The first and second shifting projections keep succeeding ones of the photo film units succeeding to the first photo film unit offset from the outlet slit toward the resilient sheet, for preventing the succeeding photo film units from passing the outlet slit.

Furthermore, an insertion opening is formed in the second wall, for receiving a pad mechanism of a camera, the resilient sheet being pushed by the pad mechanism therethrough. Furthermore, a cover sheet is disposed between the photo film units and the exposure opening, for closing the exposure opening in a light-tight manner, the cover sheet being exited through the outlet slit prior to a use of the photo film units.

Furthermore, at least one ridge is disposed on the cover sheet to project toward the first wall, for keeping the photo film units offset from the outlet slit by contacting the first wall, to prevent the photo film units from passing the outlet slit.

The at least one ridge is disposed close to one side line of the cover sheet positioned at the outlet slit.

The at least one ridge is first and second ridges extending in an exiting direction of the cover sheet defined toward the outlet slit.

The first and second ridges are offset from the first and second shifting projections.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
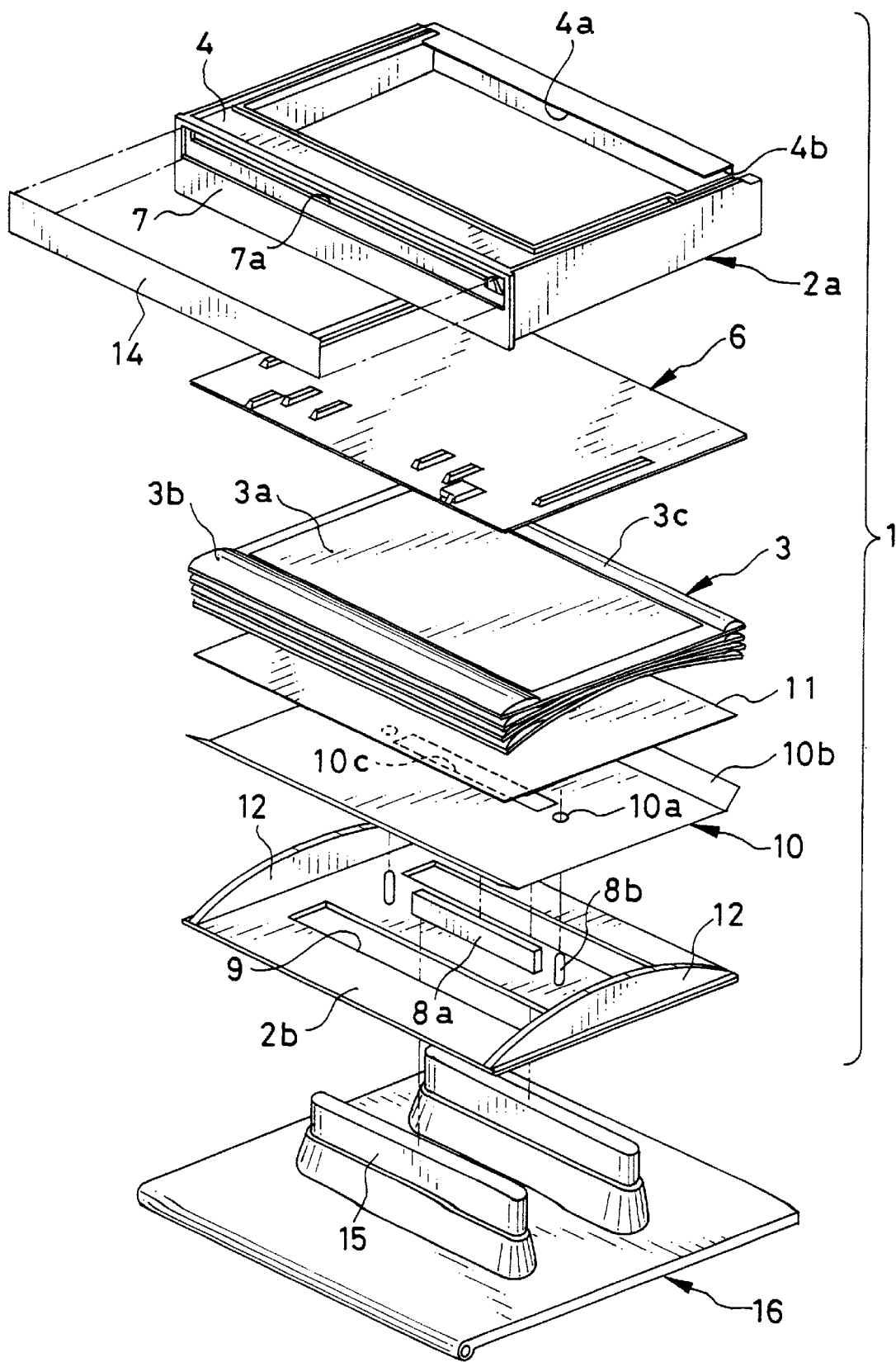
FIG. 1 is an exploded perspective illustrating an instant photo film pack.

In FIG. 1, an instant photo film pack 1 is constituted by a pack case 2 which contains a stack of plural self-processing photo film units 3. The pack case 2 consists of a case body 2a and a rear plate having an inner wall 2b. The pack case 2 is formed by injection molding from polystyrene with which carbon black and silicone are mixed. Note that the number of the photo film units 3 contained in the instant photo film pack 1 is ten, but is smaller in the drawing for the purpose of depicting the photo film units 3 with clarity.

A front plate 4 of the case body 2a is provided with an exposure opening 4a, which defines a region to expose each of the photo film units 3. A cover sheet 6 closes the exposure opening 4a, and is laid on a first one of the photo film units 3 when the instant photo film pack 1 is unused. A cutout 4b is formed in combination with the exposure opening 4a, and receives entry of a claw member in an instant camera.

An outlet slit 7a is formed in a top wall 7 of the case body 2a for passage of the photo film units 3 after being exposed. Each of the photo film units 3 and the cover sheet 6 is exited through the outlet slit 7a. As will be described in detail, a light-shielding flap 14 is attached to close the outlet slit 7a. The cover sheet 6 is produced from resin, of which an example is the same as the resin for the pack case 2. It is desirable that a ratio of silicone in the resin of the cover sheet 6 should be greater than that for the pack case 2 so as to prevent failure in the advance of the photo film units 3.

The inner wall 2b has caulking pins 8b, insertion openings 9 and a support plate 8a. The caulking pins 8b are disposed between the insertion openings 9. The support plate 8a is disposed between the caulking pins 8b. The instant camera has pad mechanisms 15, which are inserted into the insertion openings 9, enter the instant photo film pack 1, and push the photo film units 3 toward the exposure opening 4a. A light-shielding sheet 10 is secured to the inner wall 2b, and includes holes 10a, a resilient bottom edge 10b and a slot 10c. The holes 10a receive the caulking pins 8b. The resilient bottom edge 10b is bent upwards. The slot 10c receives the support plate 8a. The light-shielding sheet 10 closes the insertion openings 9 in a light-tight manner. The light-shielding sheet 10 is produced from resin. An example of the resin is polystyrene-modified polyphenylene ether, which is highly resistant to heat. Of course the light-shielding sheet 10 may be produced from the polystyrene with the carbon black and the silicone in the same manner as the pack case 2.

The central portion of the light-shielding sheet 10 is secured to the inner wall 2b by caulking the caulking pins 8b. Peripheral portions of the light-shielding sheet 10 are weakly secured to the inner wall 2b by adhesive agent of weak sealing. A small strength of this weak sealing is as small as to be pealed when the pad mechanisms 15 push the light-shielding sheet 10 through the insertion openings 9. Also a plastic reinforcer sheet 11 of a small thickness is secured to the inside of the light-shielding sheet 10. Before loading to an instant camera, the plastic reinforcer sheet 11 prevents looseness of the light-shielding sheet 10 if the light-shielding sheet 10 is peeled by shock or the like, so as to avoid leaking of light through the insertion openings 9. The support plate 8a inserted through the slot 10c contacts the center of the plastic reinforcer sheet 11, and pushes the photo film units 3 toward the exposure opening 4a.

The photo film units 3 are protected from ambient light in the instant photo film pack 1 containing the cover sheet 6 before use. If the cover sheet 6 is pushed inadvertently, a space occurs between the cover sheet 6 and the exposure opening 4a, to allow ambient light to fog or expose the photo film units 3 accidentally. Thus two support ridges 12 are disposed on the inner wall 2b to extend vertically in the instant photo film pack 1. The support ridges 12 contact the rear of the stack of the photo film units 3, and push the photo film units 3 to the exposure opening 4a.

A rear door 16 of the instant camera is provided with the pad mechanisms 15, the number of which is the same as that of the insertion openings 9. When the rear door 16 is closed after the loading of the instant photo film pack 1 into a photo film loading chamber of the instant camera, the pad mechanisms 15 are inserted through the insertion openings 9 into the pack case 2. Spring members are associated with the pad mechanisms 15, and operate so that the photo film units 3 are pushed toward the exposure opening 4a.

Each of the photo film units 3 includes an exposure portion 3a of a photosensitive sheet, a solution pod 3b and a trap portion 3c. The photosensitive sheet includes a photosensitive layer and a light receiving layer. The solution pod 3b encloses processing solution. The trap portion 3c traps and hardens the surplus part of the processing solution.

Figure 2A:
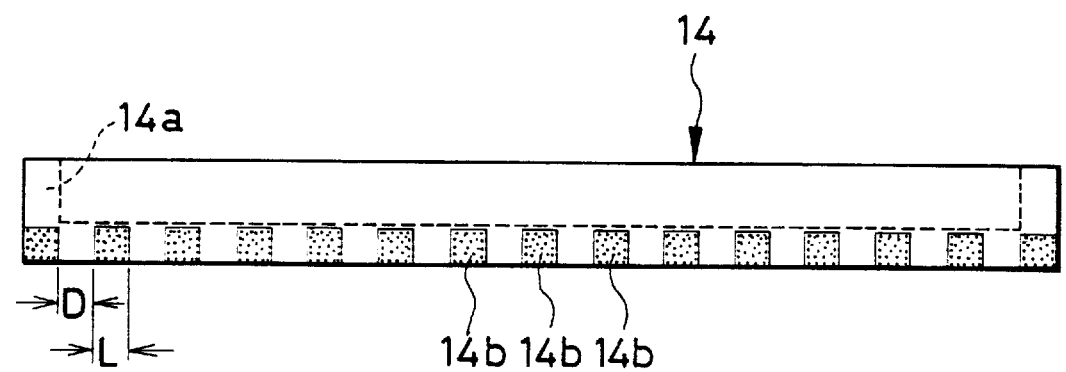
FIG. 2A is an explanatory view in plan, illustrating a light-shielding flap for an outlet slit in the photo film pack.
Figure 2B:
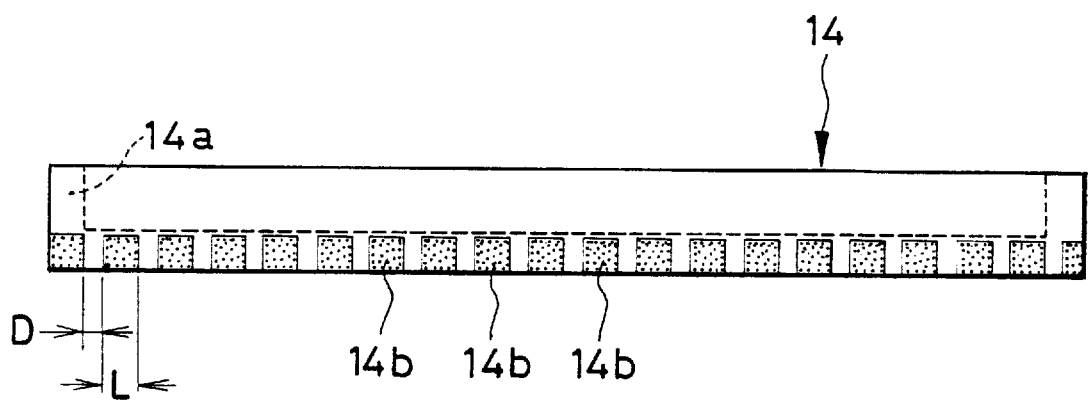
FIGS. 2B, 3A, 3B and 3C are explanatory views in plan, illustrating other preferred light-shielding flaps with various adhering patterns.

In FIGS. 2A and 2B, a back surface of the light-shielding flap 14 closing the outlet slit 7a is provided with coating pattern 14a having a channel shape, and coated with hot-melt adhesive agent in a uniform manner.

For manufacturing the instant photo film pack 1, a melting iron (not shown) is used to press the coating pattern 14a in the light-shielding flap 14. The iron includes projections arranged in a predetermined pattern and heated at a predetermined high temperature. Plural adhering regions 14b are created by application of pressure and heat to the coating pattern 14a. Let L be a range of each of the adhering regions 14b. Let D be a range of each of intervals between the adhering regions 14b. In FIG. 2A, L=D. In FIG. 2B, another preferred adhering regions 14b are depicted, which satisfy L:D=2:1.

The adhering regions 14b to be attached by hot-melt adhesion have an intermittent shape constituted by a train of spots which are included in the coating pattern 14a coated with the hot-melt adhesive agent in the light-shielding flap 14. Thus there occurs no wrinkle or shrinkage in the light-shielding flap 14 even upon great changes in the temperature in the course of heating and cooling. Even the two ends of the outlet slit 7a can be closed by the light-shielding flap 14 reliably. There occurs no entry of ambient light through the ends of the outlet slit 7a into the instant photo film pack 1, so that fogging of the photo film units 3 is avoided.

In the present embodiment, the adhering regions 14b of the light-shielding flap 14 are arranged as one train of spots. However the light-shielding flap 14 of the present invention may have a plurality of adhering regions of any shape, for example circular, quadrilateral, triangular or the like. In the light-shielding flap 14, at least the adhering regions can be coated with adhesive agent, and attached to the pack case 2.

Figure 3A:
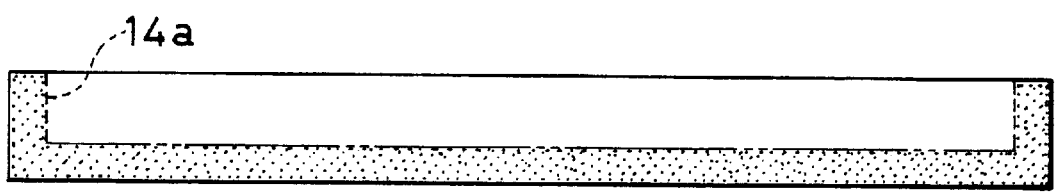
Figure 3B:
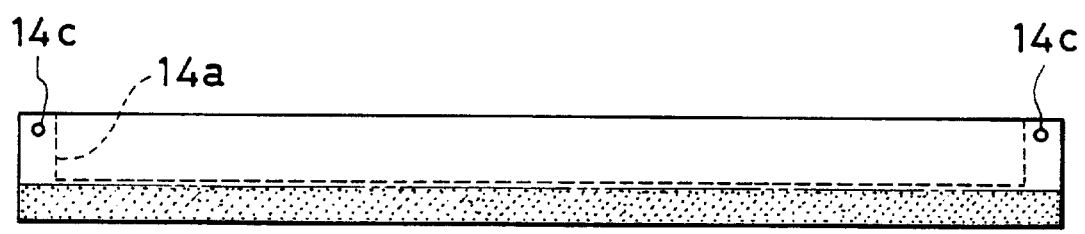
Figure 3C:

Other preferred light-shielding flaps are described now. In FIG. 3A, an adhering region is constituted by one straight portion, and two lateral portions protruding from ends of the straight portion perpendicularly. The adhering region is equal to the coating pattern 14a. In FIG. 3B, adhering regions includes one straight region and first and second lateral portions 14c sealed as spot regions. Note that the coating pattern 14a is defined by a line indicated by the broken line. In FIG. 3C, an adhering region is constituted by one straight portion, and two lateral portions protruding from ends of the straight portion perpendicularly. A coating pattern is defined by a line indicated by the broken line, so that a quadrilateral region is coated with the adhesive agent.

Note that the light-shielding flap 14, when the cover sheet 6 or the photo film unit 3 advances through the outlet slit 7a, is pushed open and deformed resiliently. Thus the adhesion of the two lateral portions 14c of the spot shape in FIG. 3B and the two lateral portions of the adhering region projecting from the straight portion in FIGS. 3A and 3C is peeled because of the resilient deformation of the light-shielding flap 14. Furthermore, it is possible to change the position and/or the size of the two lateral portions 14c of the spot shape in FIG. 3B, or the size of the two lateral portions of the adhering region projecting from the straight portion in FIGS. 3A and 3C, so that the adhesion remains without being peeled even when the light-shielding flap 14 is pushed open.

It is to be noted that the straight portion or straight region constituting the adhering regions of FIGS. 3A–3C can be provided with an intermittent adhering pattern of spot-shaped small regions according to each one of FIGS. 2A and 2B.

Figure 4A:
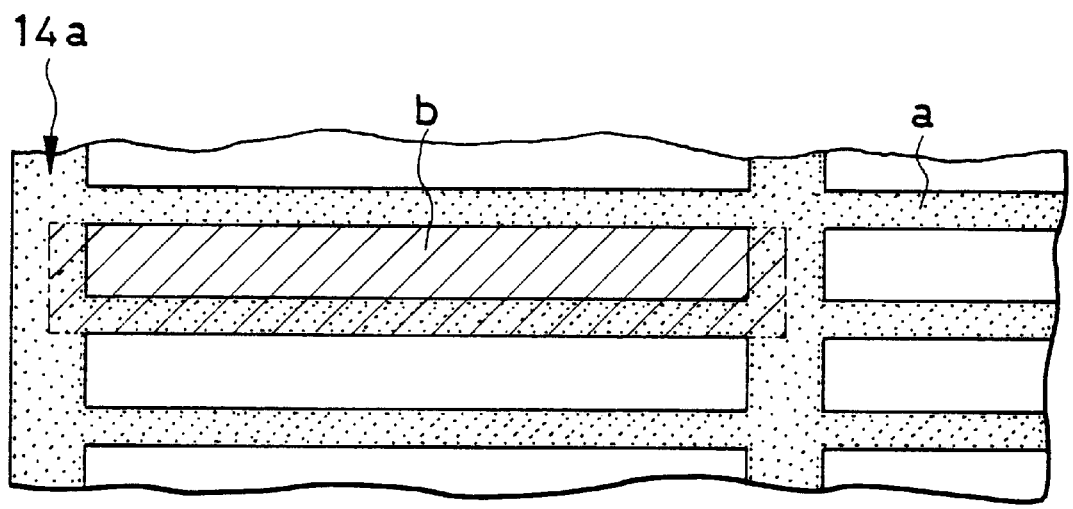
FIG. 4A is an explanatory view in plan, illustrating continuous sheet material from which the light-shielding flap is cut.
Figure 4B:
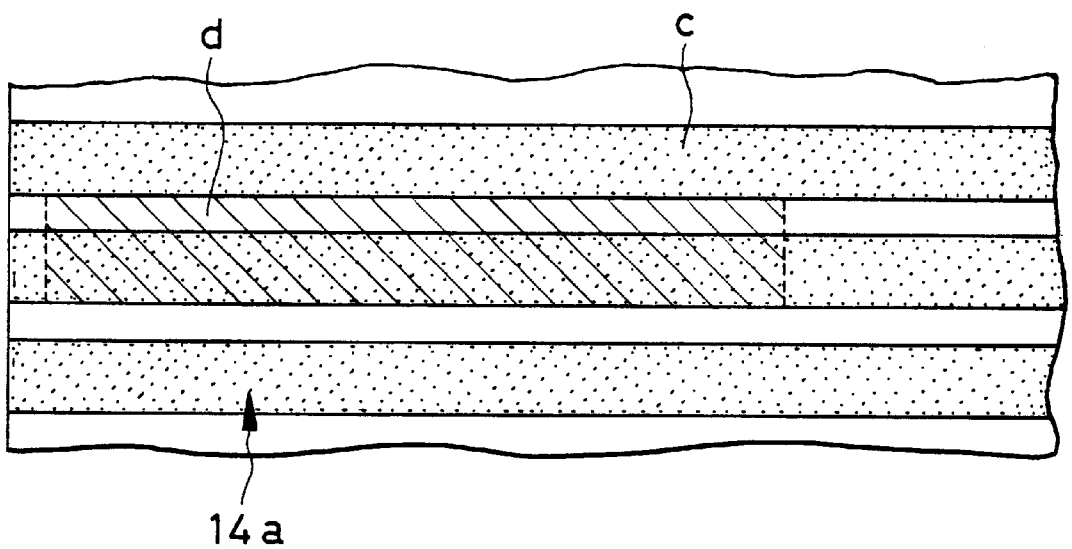
FIG. 4B is an explanatory view in plan, illustrating other preferred continuous sheet material.

In FIG. 4A, a manner of manufacturing the light-shielding flap 14 is illustrated. Web material or continuous sheet material is prepared, coated with hot-melt adhesive agent in a cyclic pattern of a grill indicated by the sign a, and cut at a predetermined size indicated by the sign b, to obtain numerous light-shielding flaps efficiently without waste. In FIG. 4B, web material or continuous sheet material is coated with hot-melt adhesive agent in a cyclic pattern of stripes indicated by the sign c, and cut at a predetermined size indicated by the sign d. If hot-melt adhesive agent is in positions located directly around the outlet slit in attachment of each light-shielding flap to the photo film pack, force required for advance of each photo film unit increased. Failure is likely to occur in the advance. Thus it is desirable that no hot-melt adhesive agent should be in positions located directly around the outlet slit.

For the light-shielding flap 14, a sheet material included as a base material is produced from polyethylene terephthalate (PET) with light-shielding agent mixed therein, and has a preferable thickness of approximately 25 $\mu$m. The hot-melt adhesive agent of the light-shielding flap 14 can be selected from various suitable examples.

Examples of methods used for applying a pattern coating of hot-melt adhesive agent are coating with hot-melt coaters in combination with a gravure roll, gravure printing, silk screen printing and the like. Examples of hot-melt adhesive agents with hot-melt coaters are ethylene-vinyl acetate copolymer types, polyethylene types, atactic polypropylene types, ethylene-acrylic acid copolymer types, polyamide types, polyester types and the like. Any type of hot-melt adhesive agent for use with plastic material may be used, for example, a polyolefin type of hot-melt adhesive agent DH579B (trade name) manufactured by Nogawa Chemical Co., Ltd.

Hot-melt adhesive agent is characterized in not including any water or solvent. There are only limited types of applicators suitable for the hot-melt adhesive agent. There is heat-pressure adhesive agent, which is obtained by resolving the hot-melt adhesive agent in solvent or by emulsifying the hot-melt adhesive agent, and which can be printed by widely used printing machines.

An example of hot-melt adhesive agent for use in the silk screen printing is Seikadain 1900W (trade name) manufactured by Dainichi Chemical Industry Co., Ltd., which is an ethylene-vinyl acetate (EVA) copolymer emulsion type of heat-pressure adhesive agent. Examples of hot-melt adhesive agents for use in the gravure printing are a heat activation type of crystallization retarding adhesive agent, a heat pressure type of adhesive agent, and the like. Examples of the heat pressure type of adhesive agent are Seikadain 1900W as mentioned above, and PP66 Seal-C (trade name) manufactured by Toyo Ink Manufacturing Co., Ltd. as an ethylene-vinyl acetate (EVA) copolymer solvent type of heat-pressure adhesive agent.

In spite of the above description, the adhesive agent in the present invention may be a type different from hot-melt adhesive agent.

EXAMPLE

Experiments were conducted to test the above embodiment in relation to subjecting a sample to light.

Sample of the invention. The light-shielding flap was coated with adhesive agent in a linear manner intermittently. An instant photo film pack for containing ten self-processing photo film units was provided with the light-shielding flap, which was attached to the outlet slit by heat attachment at 130° C. for 0.5 second. The photo film pack was left to stand at 70° C. for two (2) hours, then was returned to an environment of a room temperature, was subjected to light of 70,000 lux for three (3) minutes. Afterwards, the processing solution was spread.

Comparative example. The light-shielding flap was coated with adhesive agent in a linear manner continuously. An instant photo film pack for containing ten self-processing photo film units was provided with the light-shielding flap, which was attached to the outlet slit in the linear manner by heat attachment at 130° C. for 0.5 second. After this, the photo film pack was treated in the same manner as the Sample of the invention.

Results. According to the Sample of the invention, no fogging was discovered on any of the ten photo film units. But according to the Comparative example, even the second, third or fourth of the stacked photo film units was fogged.

Another preferred instant photo film pack is described, in which failure in advancing self-processing photo film units is avoided.

Figure 41:
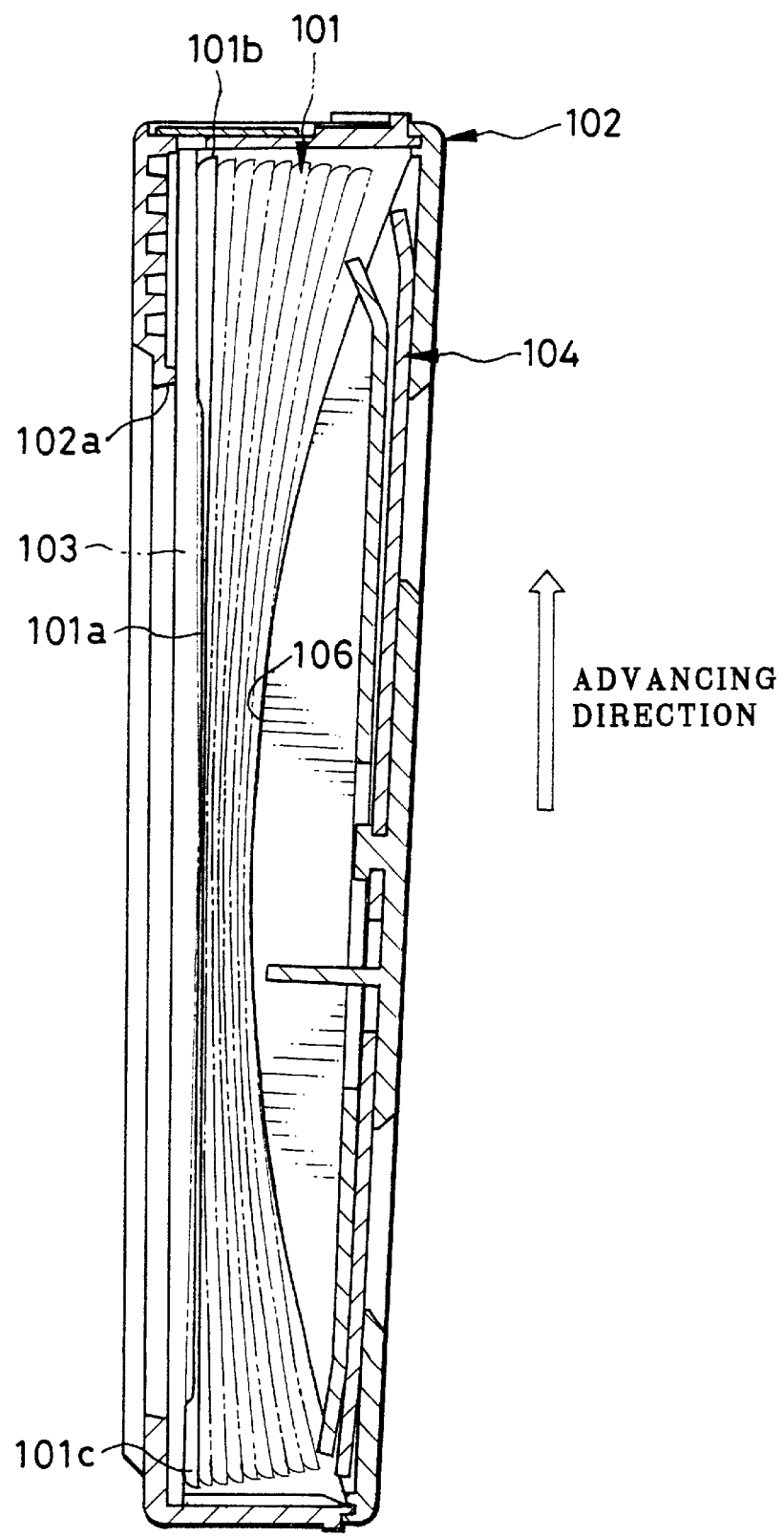
FIG. 41 is a vertical section illustrating an instant photo film pack according to the prior art.
Figure 42:
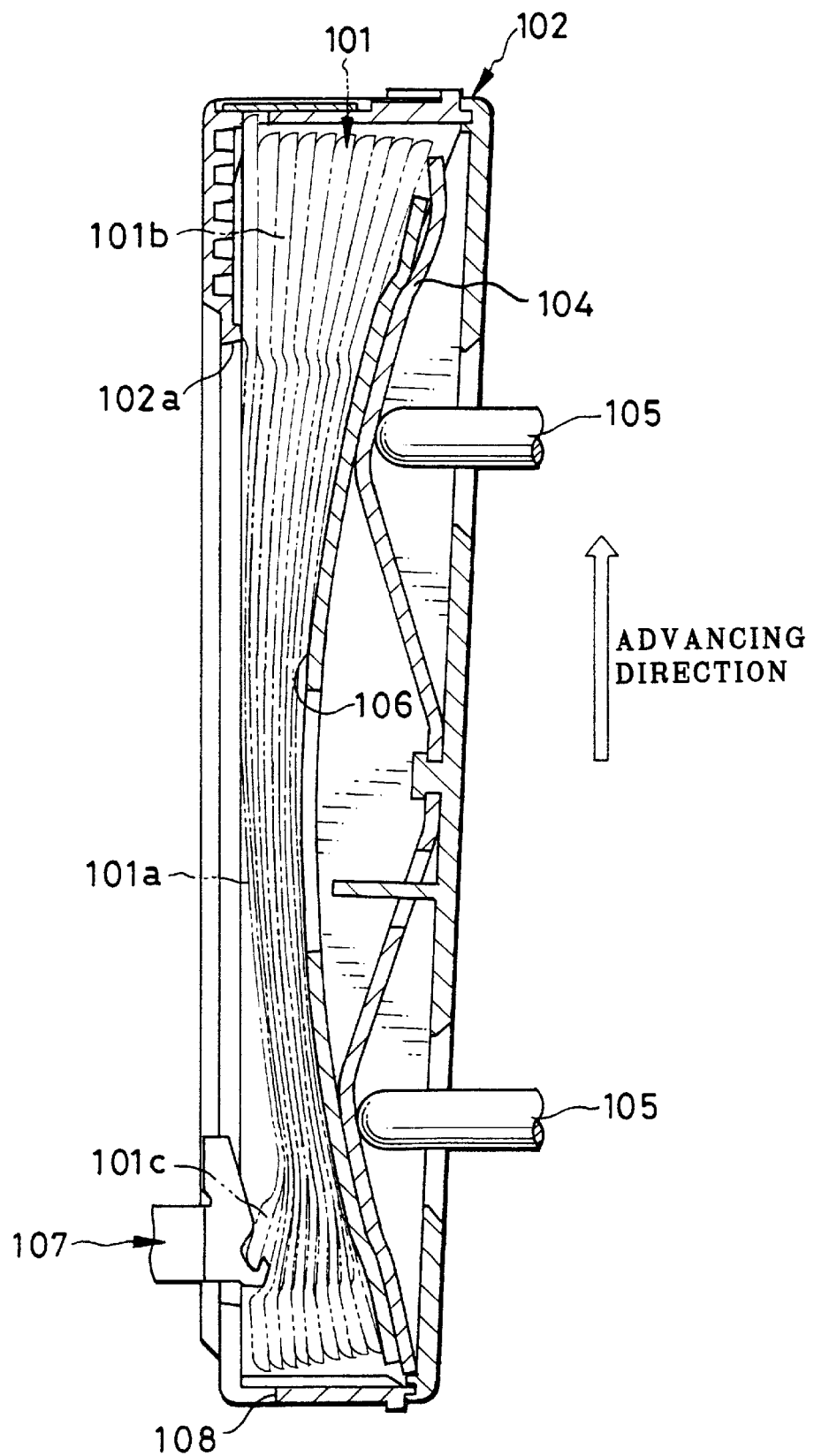
FIG. 42 is a vertical section illustrating the instant photo film unit into which pad mechanisms of a camera is inserted according to the prior art.

JP-A 7-209814 discloses the prior art, which is schematically illustrated in FIGS. 41 and 42.

Before an instant camera is loaded with an instant photo film pack 102, it is likely that a user pushes a cover sheet 103 through an exposure opening 102a in the instant photo film pack 102. Due to a difference in the thickness between an exposure portion 101a and a solution pod 101b or a trap portion 101c, the center of the exposure portion 101a may be depressed so as to create a gap between the cover sheet 103 and the instant photo film pack 102. Ambient light may enter the gap to fog self-processing photo film units 101. To prevent such an accident, U.S. Pat. No. 5,541,683 (corresponding to JP-A 7-159932 and 7-244336) discloses a structure with two support ridges 106, which have an arc-shape, are located opposite to the exposure opening 102a, and between which light-shielding sheets 104 are disposed.

A claw member 107 of the instant camera enters a cutout 108 in the instant photo film pack 102, becomes engaged with a bottom of the trap portion 101c of a first one of the photo film units 101 positioned on the exposure opening 102a, and pushes it toward an outlet slit 102b. The first photo film unit 101 receives load applied by pad mechanisms 105 of the instant camera to the rear of the stack of the photo film units 101. The photo film units 101 remain arc-shaped with central convexity toward the exposure opening 102a, so that the load is resistance to the movement of the exposed photo film unit 101 in the advancing direction. Upon the push of the claw member 107 to the bottom edge of the exposed photo film unit, its portion between the trap portion 101c and the exposure portion 101a is likely to flex in a direction away from the exposure opening 102a and in a convex shape due to the load. If the claw member 107 continues to operate, the trap portion 101c becomes bent back irrecoverably, becomes disengaged from the trap portion 101c, and fails to be advanced.

Figure 5:
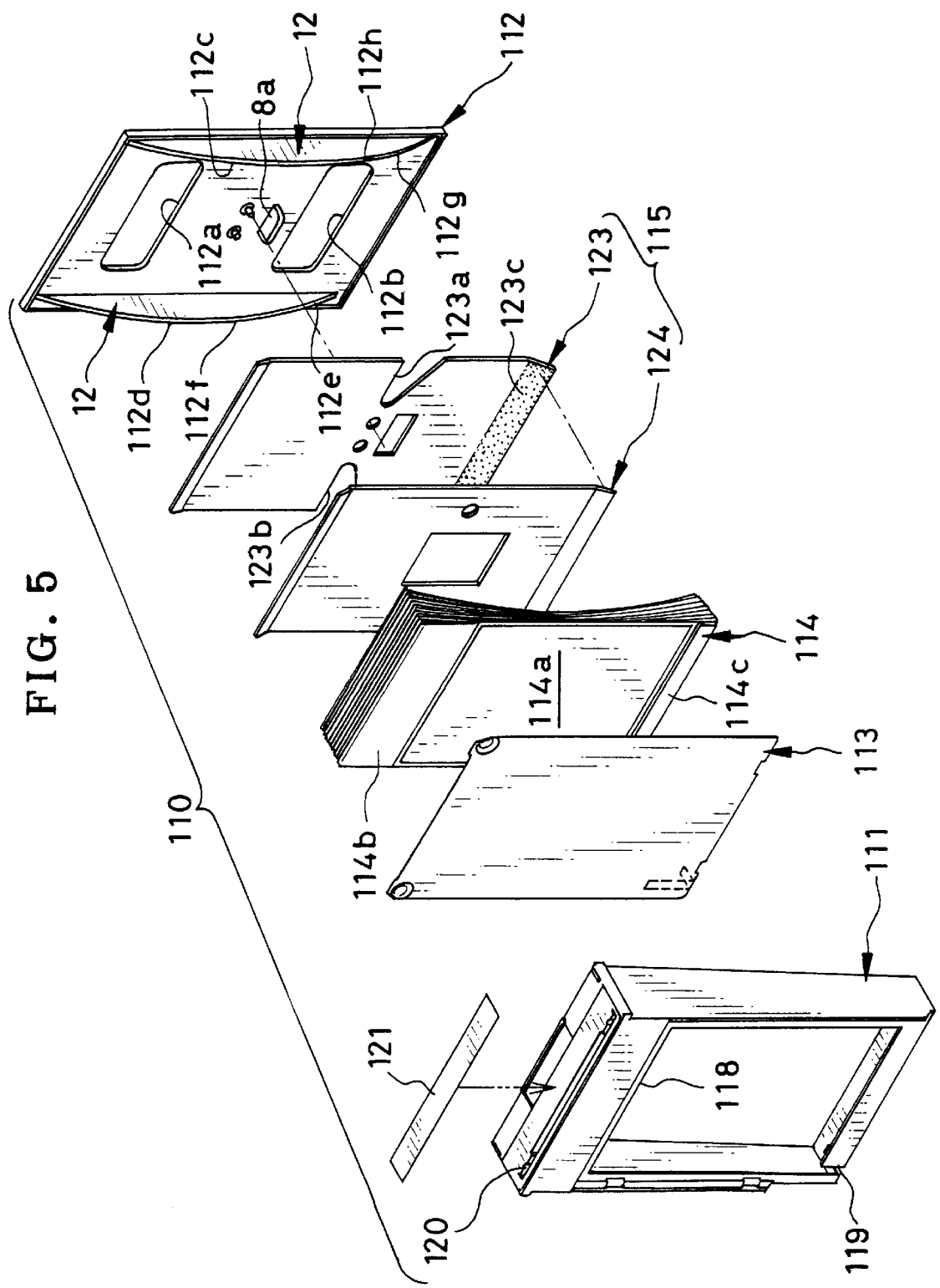
FIG. 5 is an exploded perspective illustrating another preferred instant photo film pack having improved photo-film-pushing support ridges.

In FIG. 5, an instant photo film pack 110 of the present invention is illustrated, in which failure in advancing an exposed self-processing photo film unit is avoided.

In FIG. 5, self-processing photo film units 114 include an exposure portion 114a, a solution pod 114b and a trap portion 114c. The exposure portion 114a is constituted by a photosensitive layer positioned at an exposure surface, a white diffusing reflecting layer, and an image receiving layer positioned at a back surface. The solution pod 114b is disposed downstream in the advancing direction, and encloses processing solution. When processing solution is spread between the photosensitive layer and the image receiving layer, a latent image, having recorded in the photosensitive layer, is transferred to the image receiving layer as a positive image after passage through the diffusing reflecting layer. The image transferred to the image receiving layer is observable from a side opposite to the exposure portion 114a as a positive image. The trap portion 114c is disposed opposite to the exposure portion 114a with reference to the advancing direction, and captures and hardens the surplus part of the processing solution after being spread between the photosensitive layer and the image receiving layer from the solution pod 114b. The exposure portion 114a has a thickness smaller than that of the solution pod 114b or the trap portion 114c. The photo film units 114 are a mono-sheet type, which has a quadrangular shape longer vertically than horizontally, and can be treated as a single sheet in the course of development. Each of the photo film units 114 is advanced in the advancing direction which is their longitudinal direction.

Light-shielding sheets 115 include a rear light-shielding sheet 123 and a front reinforcer sheet 124, both of which are plastic and resilient. A rear plate 112 has the rear light-shielding sheet 123 secured thereto. Before insertion into the instant camera, the rear light-shielding sheet 123 closes insertion openings 112a and 112b formed in the rear plate 112. Also cutouts 123a and 123b are formed in the rear light-shielding sheet 123.

A resilient bottom edge 123c is located in the rear light-shielding sheet 123, and indicated by the dotted area in the drawing. The front reinforcer sheet 124 is attached to the resilient bottom edge 123c.

Figure 6:
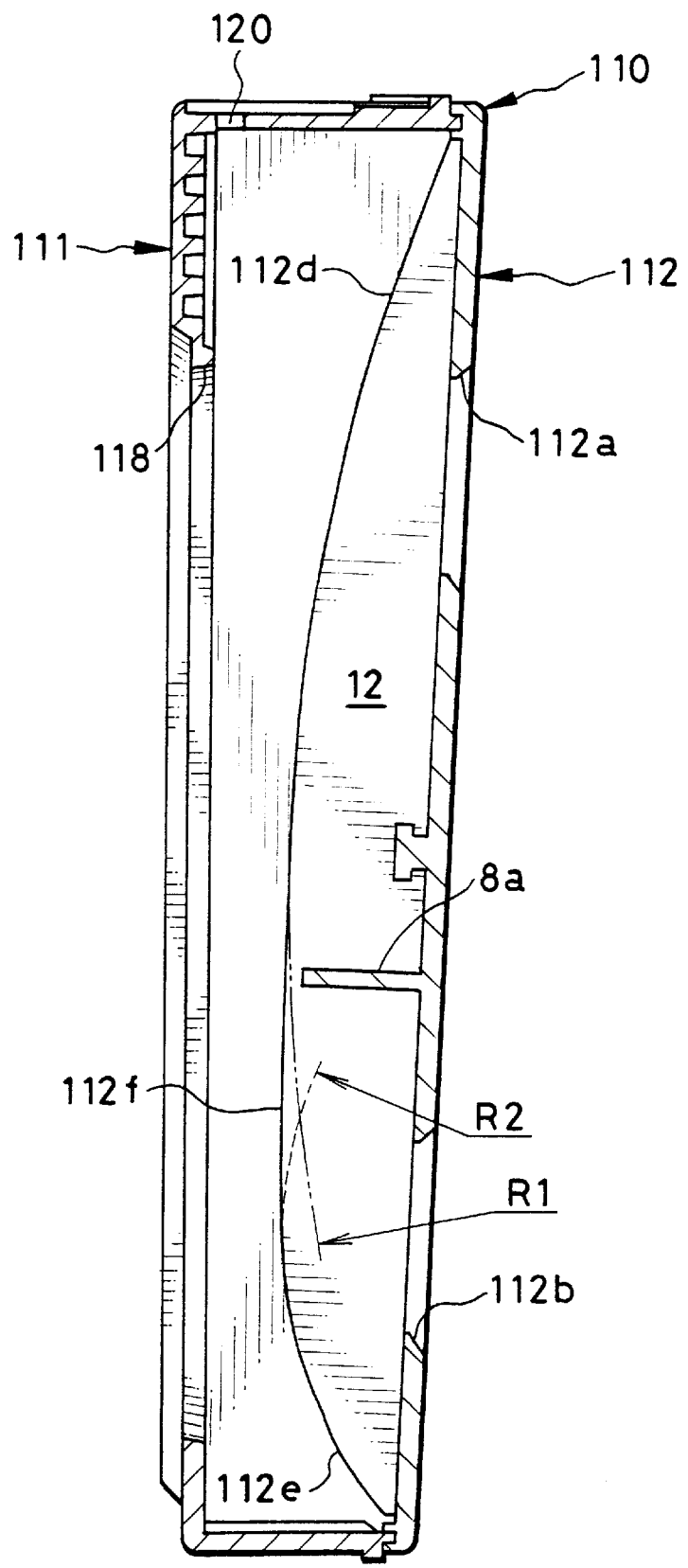
FIG. 6 is a vertical section illustrating the photo film pack.

In FIG. 6, the support ridge 12 has a second section 112d which projects forwards from the rear plate 112, is an arc shape, is convex with a radius R1 of curvature. The overall shape of the support ridge 12 corresponds to the curve of the photo film units 114 due to a difference in the thickness between the exposure portion 114a and the solution pod 114b or the trap portion 114c.

An exposure opening 118 is located in front of the photo film units 114. A third section 112e of the support ridge for applying pressure is formed in connection with the second section 112d. The third section 112e presses the rear of the stacked photo film units 114 toward the exposure opening 118 beyond the level of the second section 112d by contacting a rear portion of the photo film units 114 between the trap portion 114c and the exposure portion 114a, for the purpose of preventing the foremost one of the photo film units 114 from irrecoverably flexing back upon contact with a claw member of the instant camera.

The convexity of the third section 112e has a radius R2, which is smaller than the radius R1. A first section 112f is included in the support ridge, is straight between the second section 112d and the third section 112e, and tangential to both of them. The first section 112f is parallel to the advancing direction of the photo film units 114. Note that there is one more support ridge 12 which, in FIG. 5, includes a first section 112h, a second section 112c and a third section 112g. Any of those is shaped similar to those of the first support ridge 12.

Figure 7:
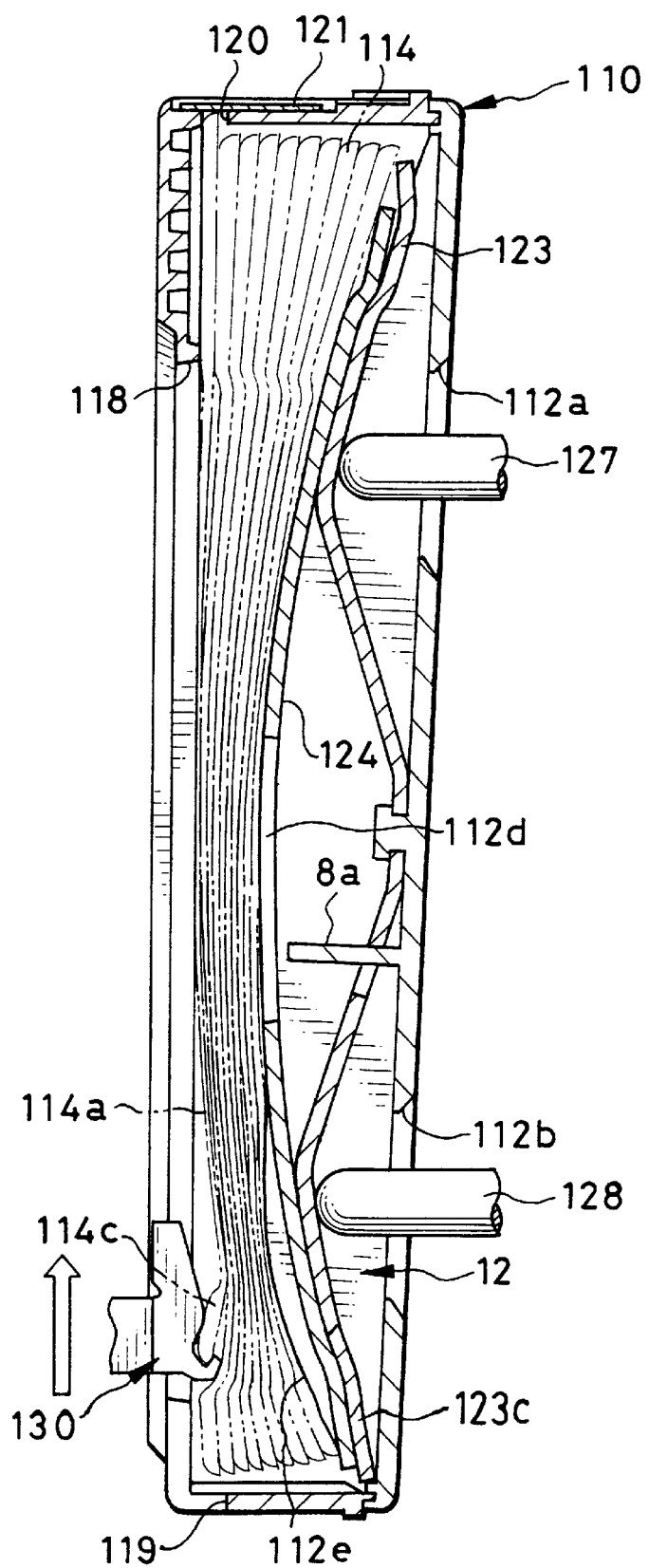
FIG. 7 is a vertical section illustrating the photo film pack into which pad mechanisms of a camera are inserted.

The operation of the present embodiment is described now. A photo film loading chamber of an instant camera is loaded with the instant photo film pack 110. In FIG. 7, pad mechanisms 127 and 128 of the instant camera are inserted through the insertion openings 112a and 112b, and push the rear light-shielding sheet 123 toward the exposure opening 118. The combination of the rear light-shielding sheet 123 and the front reinforcer sheet 124 is pressed against the rear of the stacked photo film units 114, and becomes bent in an arc-shape, and convex toward the exposure opening 118.

In the instant camera, the shutter is released in a preliminary manner. A claw member 130 of the camera is inserted in a cutout 119. A corner of a cover sheet 113 is engaged with the claw member 130, which pushes the cover sheet 113 toward an outlet slit 120. The cover sheet 113 is advanced through the outlet slit 120 while a light-shielding flap 121 is pushed open. When the cover sheet 113 is moved out of the outlet slit 120 at a predetermined length, spreader rollers disposed outside the outlet slit 120 and incorporated in the instant camera nip the top end of the cover sheet 113, and ejected from the instant camera. On the side of the instant photo film pack 110, the first one of the photo film units 114 becomes set on the exposure opening 118. The instant camera is ready for taking an exposure.

To take an exposure, the shutter is released in a manner similar to the above. The exposed first photo film unit 114 is forcibly pushed and advanced by the claw member 130 toward the outlet slit 120. In the meantime, considerable load from the pad mechanisms 127 and 128 is applied indirectly to the exposed photo film unit 114. The remaining ones of the photo film units 114 behind the exposed one are flexed with a convex shape toward the exposure opening 118 at their center. Thus the load from the pad mechanisms 127 and 128 is being concentrated at the middle of the exposed photo film unit 114. Upon the push of the claw member 130 to the bottom edge of the exposed photo film unit, its portion between the trap portion 114c and the exposure portion 114a is likely to flex in a direction away from the exposure opening 118 convexly due to the load.

In the present embodiment, however, the third sections 112e and 112g push positions between the trap portion 114c and the exposure portion 114a toward the exposure opening 118 to an extent greater than the second sections 112c and 112d. Even when the claw member 130 operates, the third sections 112e and 112g prevent the exposed photo film unit 114 from flexing further. The claw member 130 is safely kept engaged with the trap portion 114c. Therefore the exposed photo film unit 114 can be advanced by the claw member 130.

The exposed photo film unit 114 being advanced pushes open the light-shielding flap 121, and moves toward spreader rollers, which tear open the solution pod 114b. The processing solution from the solution pod 114b is spread by the spreader rollers toward the exposure portion 114a, while each of the photo film units 114 is exited from the instant camera.

At each time when an exposure is taken, one of the photo film units 114 is advanced. The remainder of the photo film units 114 inside the camera decrease one exposure after another. The pad mechanisms 127 and 128 gradually move in, and push the rear light-shielding sheet 123 and the front reinforcer sheet 124 toward the exposure opening 118. After a certain number of photo film units 114 are ejected, the rear light-shielding sheet 123 and the front reinforcer sheet 124 come nearer to the exposure opening 118 than the second sections 112c and 112d or the third sections 112e and 112g. Each of the photo film units 114 is pushed by the light-shielding sheet 115 to the exposure opening 118, and can be advanced by the claw member 130.

In the present embodiment, the first sections 112f and 112h are straight in connection with the second sections 112c and 112d, and operate for regularizing the push to the photo film units 114 and for reliably shielding light. However the straight first sections 112f and 112h may be omitted from the support ridges according to the present invention. In other words, the first sections 112f and 112h may be arc-shaped. In the present embodiment, the third sections 112e and 112g for application of pressure are arc-shaped, and have the radius of curvature R2. Of course the third sections 112e and 112g may have a shape of an arc of an ellipse.

A pack case 111, and also the cover sheet 113, the rear light-shielding sheet 123, the front reinforcer sheet 124 and the rear plate 112 are formed by injection molding from plastic material. In the injection molding, each of the molded parts is provided with gate marks and marks of ejector pins which knock the molded parts out of molds. Should those marks come in contact with the photo film units 114, the photo film units 114 would be scratched. Thus the gate marks are disposed on faces retracted from the surface of each molded part. The marks are disposed to be retracted faces by thrusting the ejector pins into the molded part.

Figure 8:
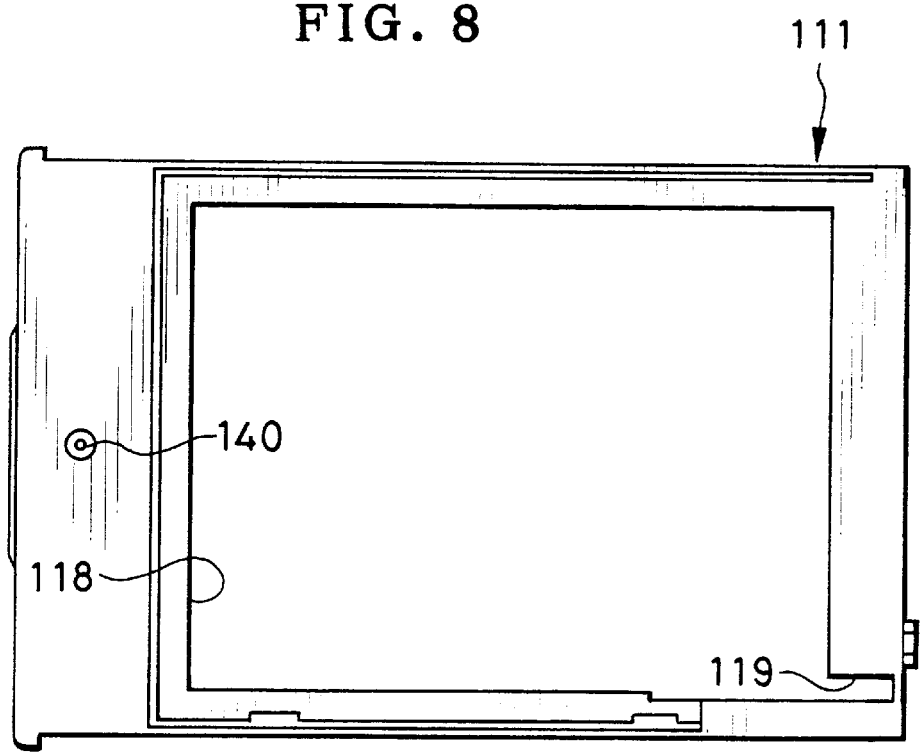
FIG. 8 is a front elevation illustrating a pack case.
Figure 9:
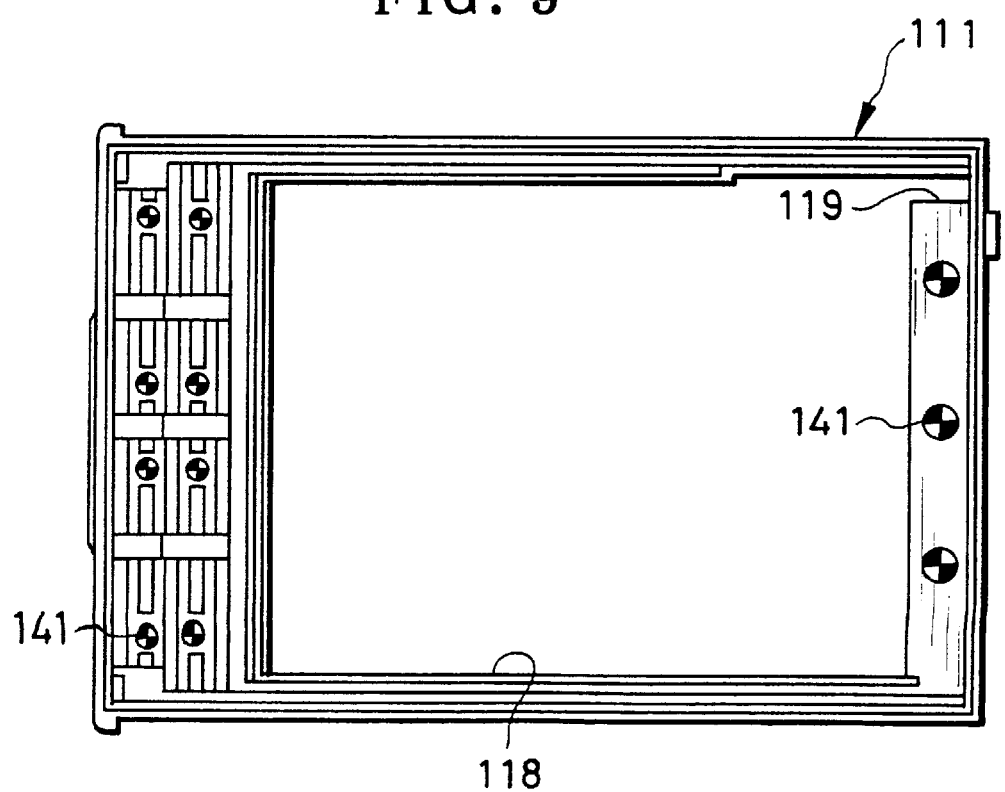
FIG. 9 is a rear elevation illustrating the pack case.
Figure 10:
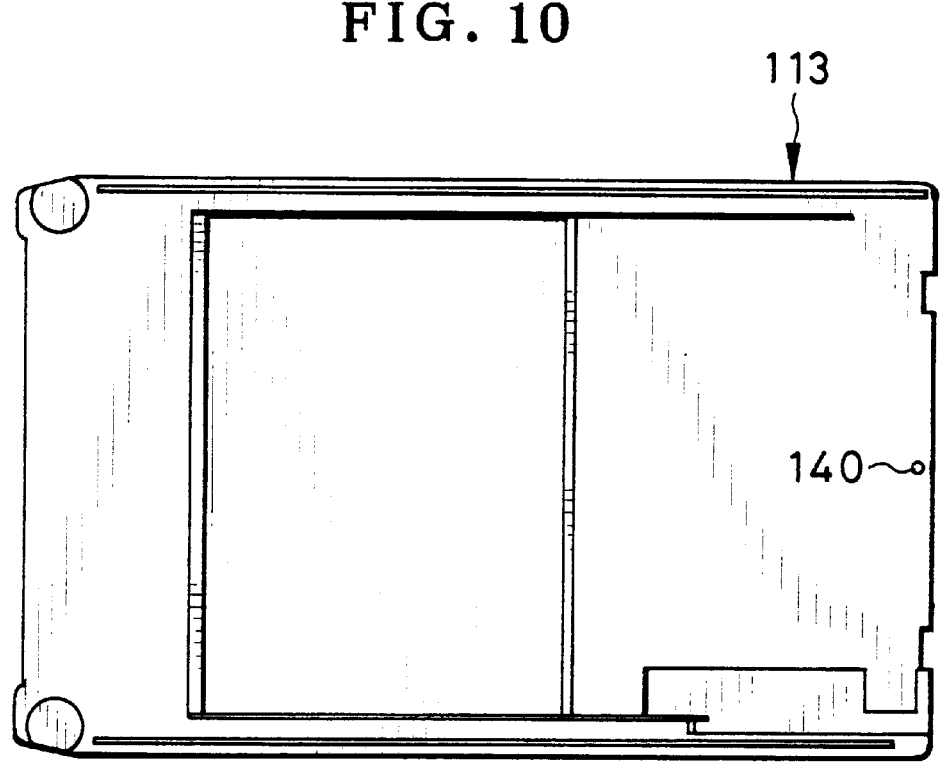
FIGS. 10 and 11 are front and rear elevations illustrating a cover sheet.
Figure 11:
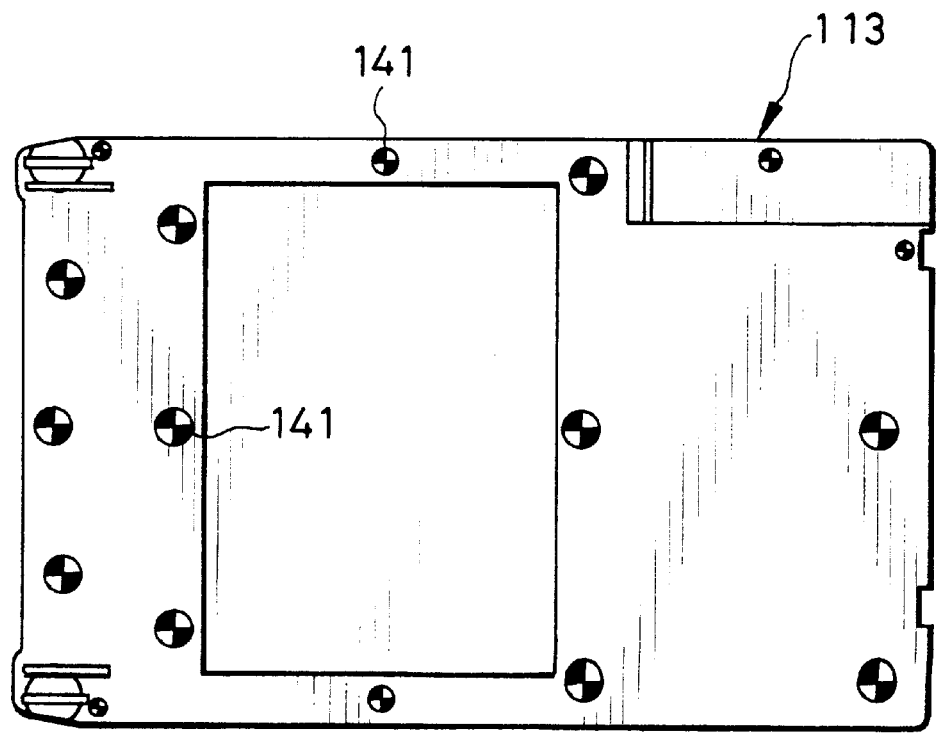
Figure 12:
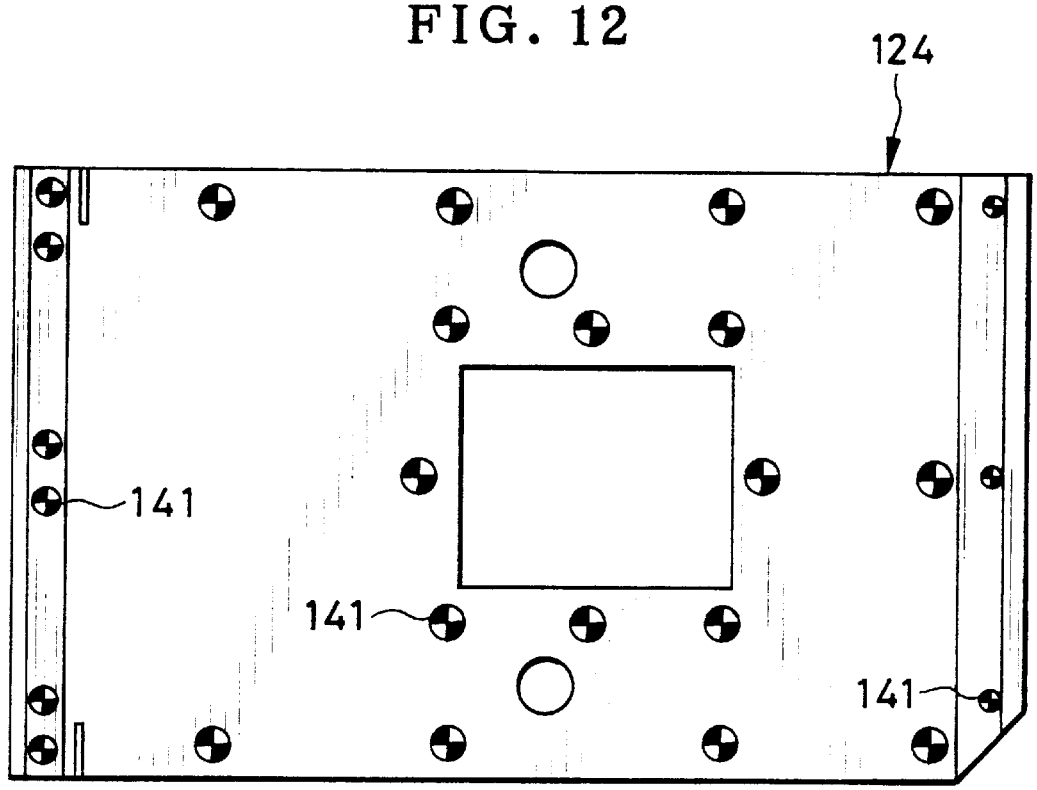
FIGS. 12 and 13 are front and rear elevations illustrating a light-shielding front reinforcer sheet.
Figure 13:
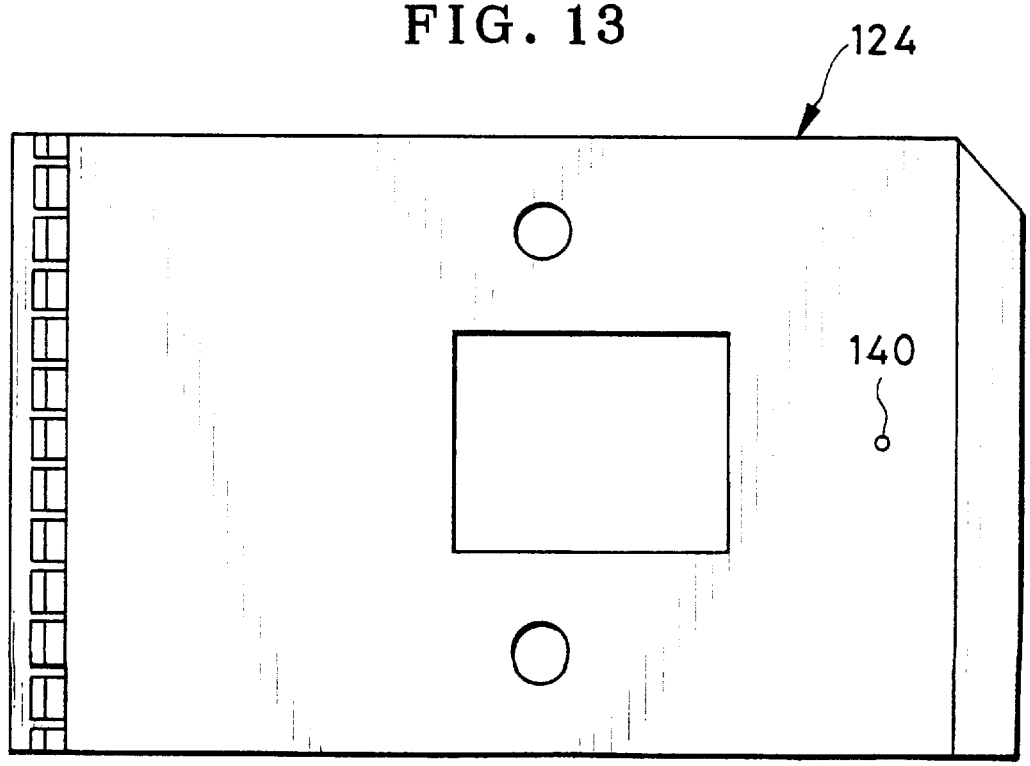
Figure 14:
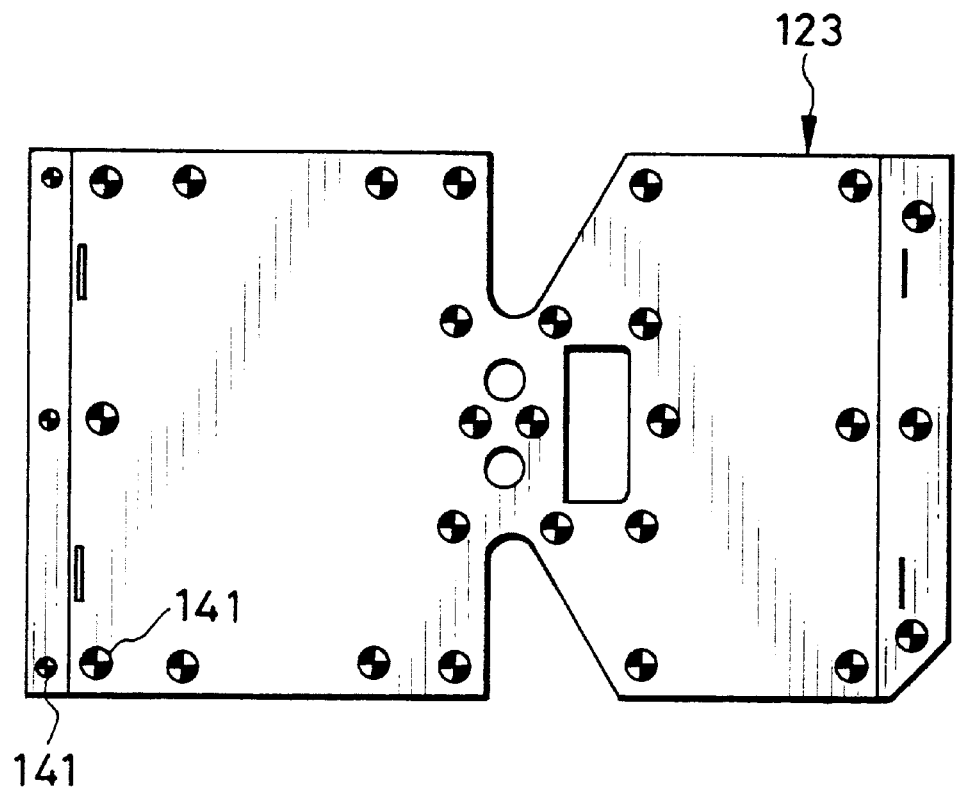
FIGS. 14 and 15 are front and rear elevations illustrating a rear light-shielding sheet.
Figure 15:
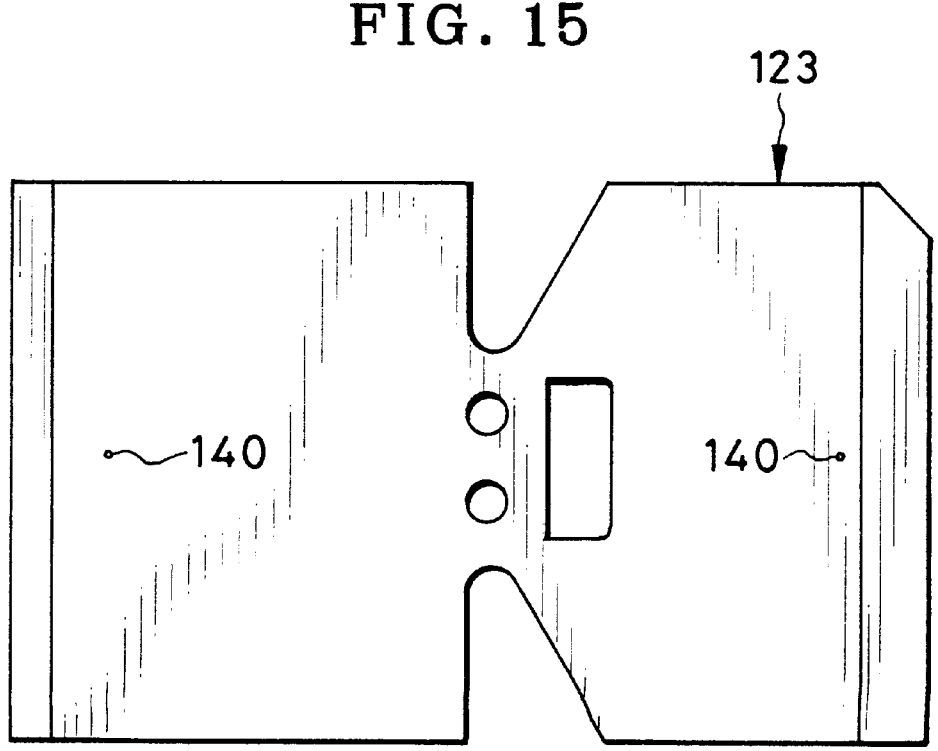
Figure 16:
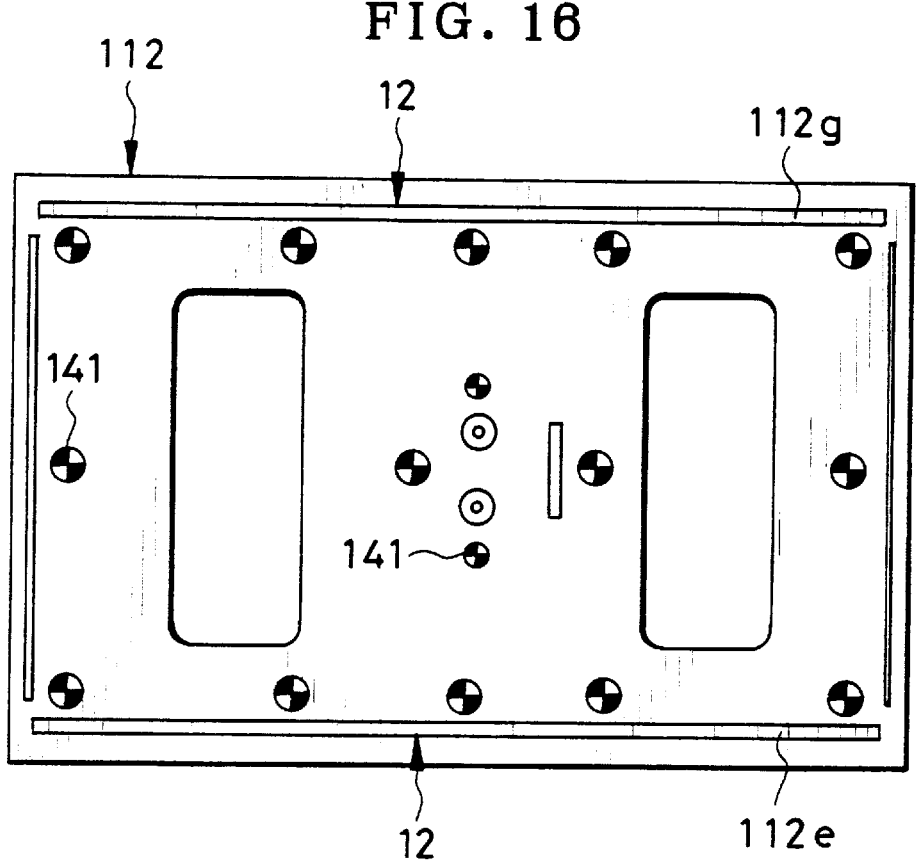
FIGS. 16 and 17 are front and rear elevations illustrating a rear plate.
Figure 17:
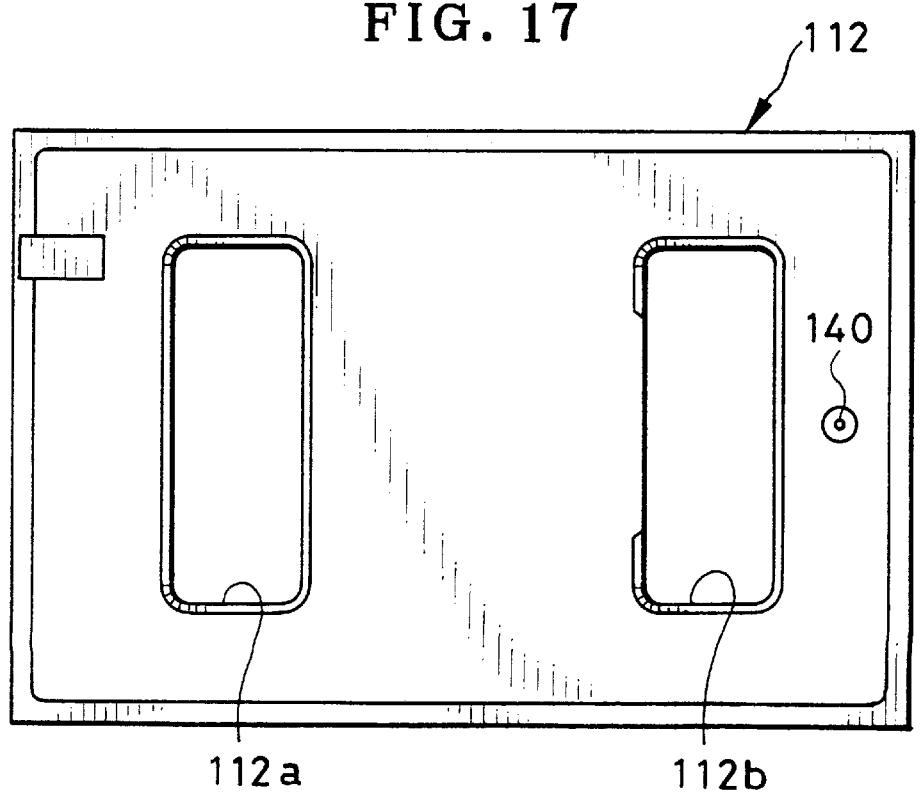

In FIGS. 8 and 9, positions of gate marks 140 and ejector pin marks 141 in the pack case 111 are illustrated, as results of molding the pack case 111. Although the reference numerals 140 and 141 are not indicated to all of those positions, any of the gate marks 140 and the ejector pin marks 141 are indicated symbolically with common indicia. FIGS. 10 and 11 illustrate the cover sheet 113 with the gate marks 140 and the ejector pin marks 141. FIGS. 12 and 13 illustrate the front reinforcer sheet 124 with the gate marks 140 and the ejector pin marks 141. FIGS. 14 and 15 illustrate the rear light-shielding sheet 123 with the gate marks 140 and the ejector pin marks 141. FIGS. 16 and 17 illustrate the rear plate 112 with the gate marks 140 and the ejector pin marks 141.

Figure 18:
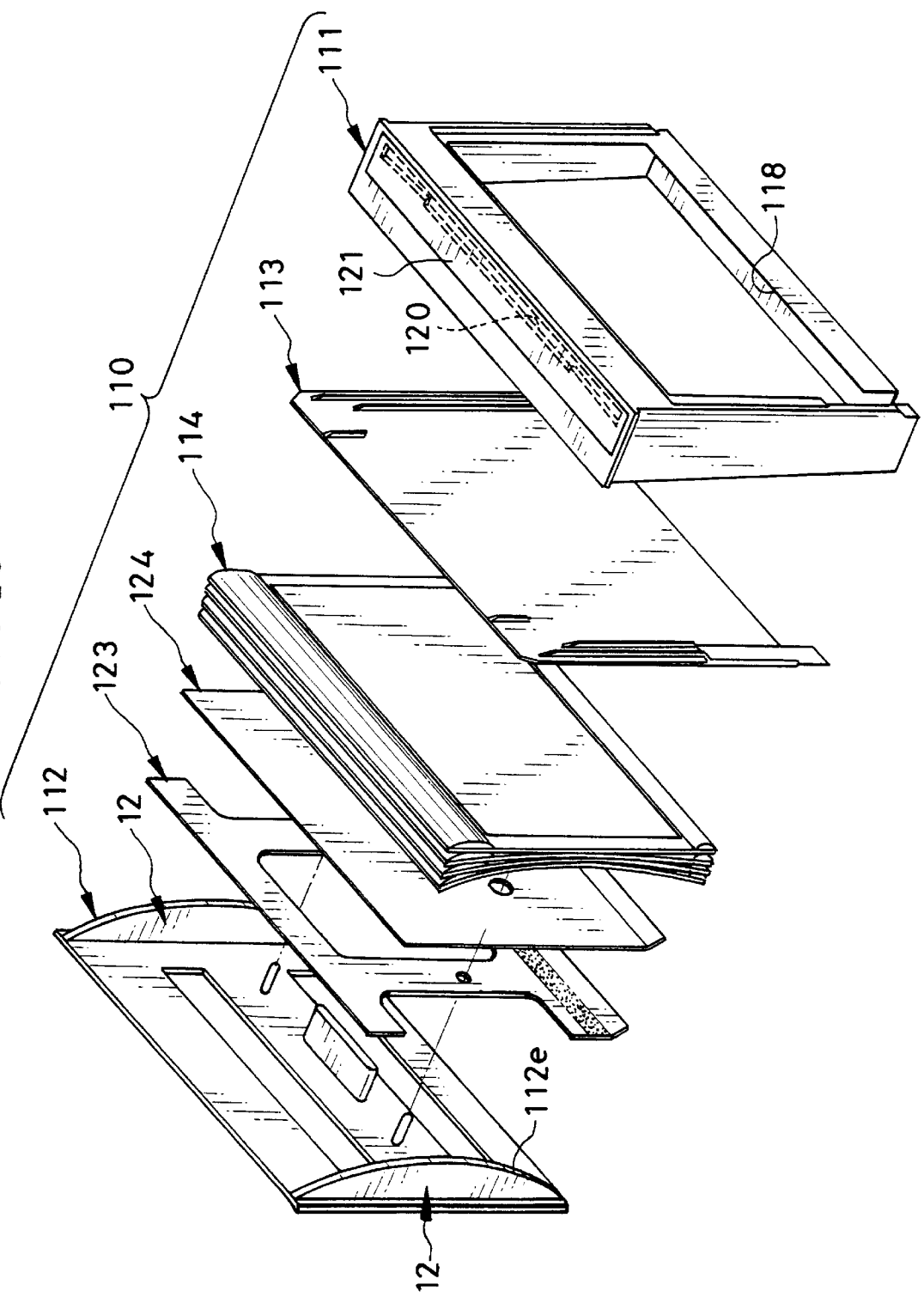
FIG. 18 is an exploded perspective illustrating still another preferred instant photo film pack horizontally longer than vertically.
Figure 19:
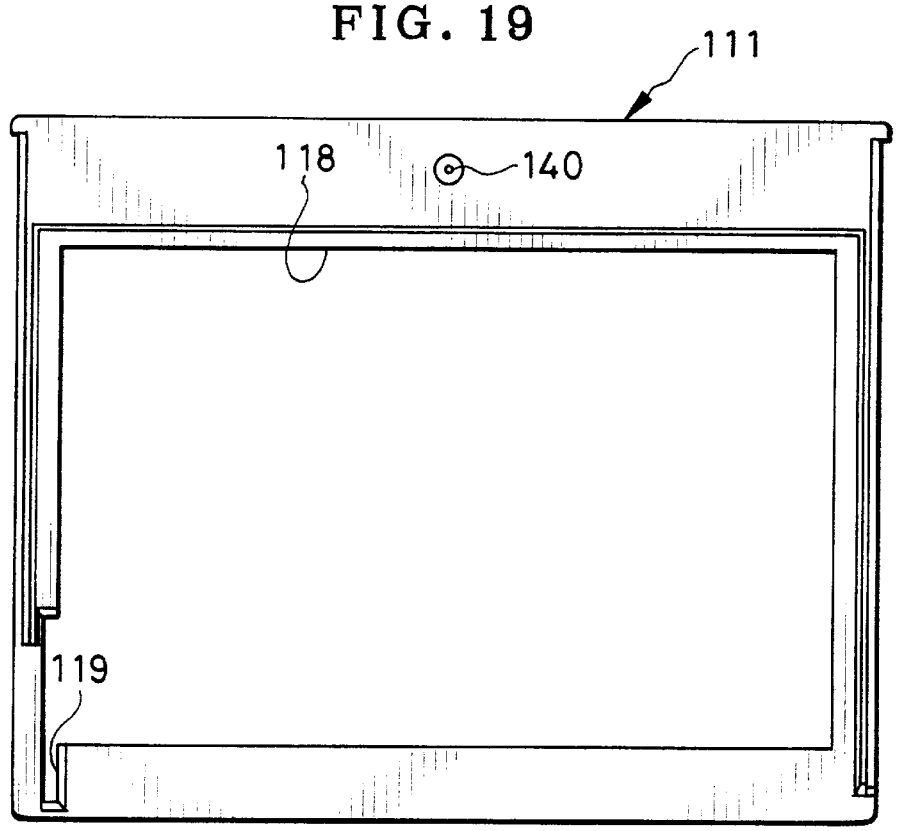
FIGS. 19 and 20 are front and rear elevations illustrating a pack case.
Figure 20:
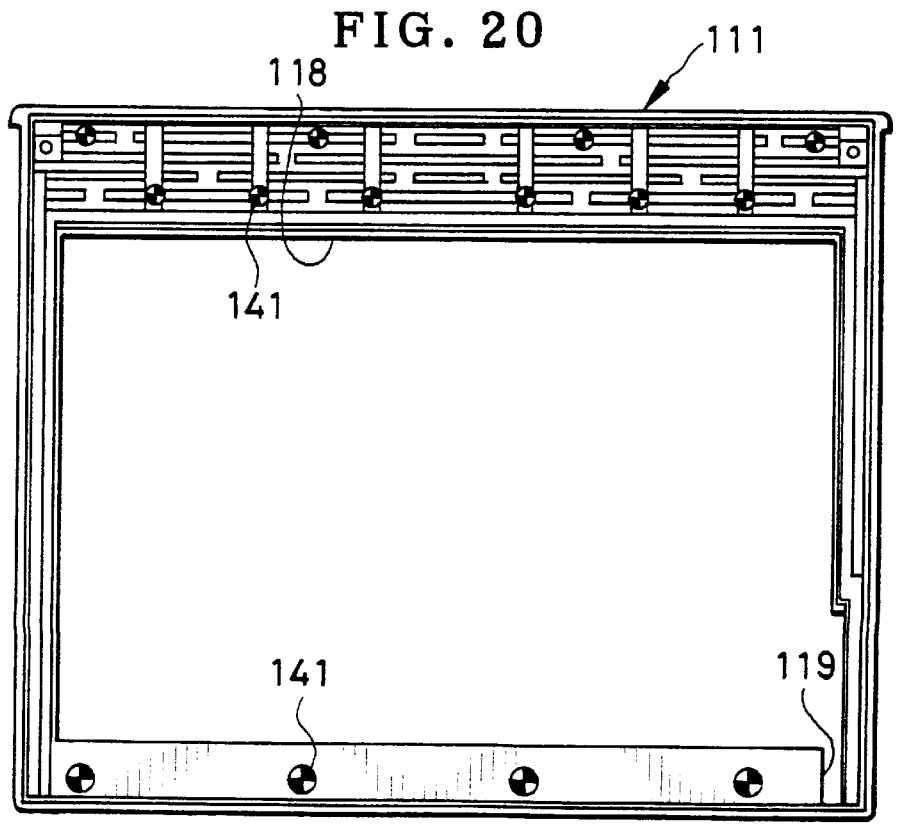
Figure 21:
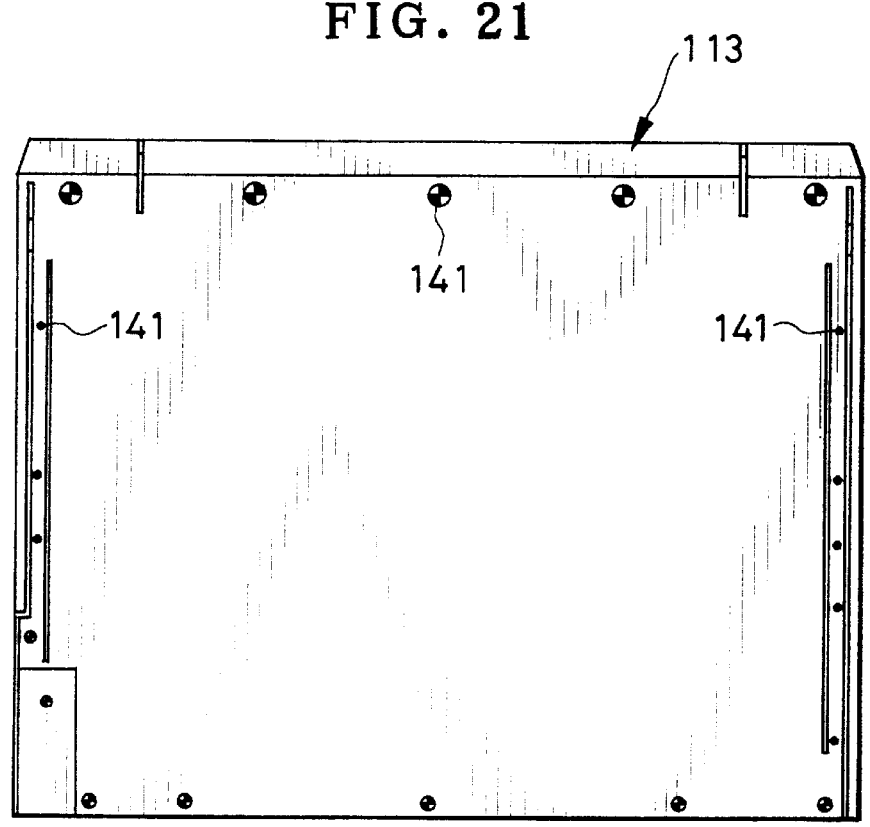
FIGS. 21 and 22 are front and rear elevations illustrating a cover sheet.
Figure 22:
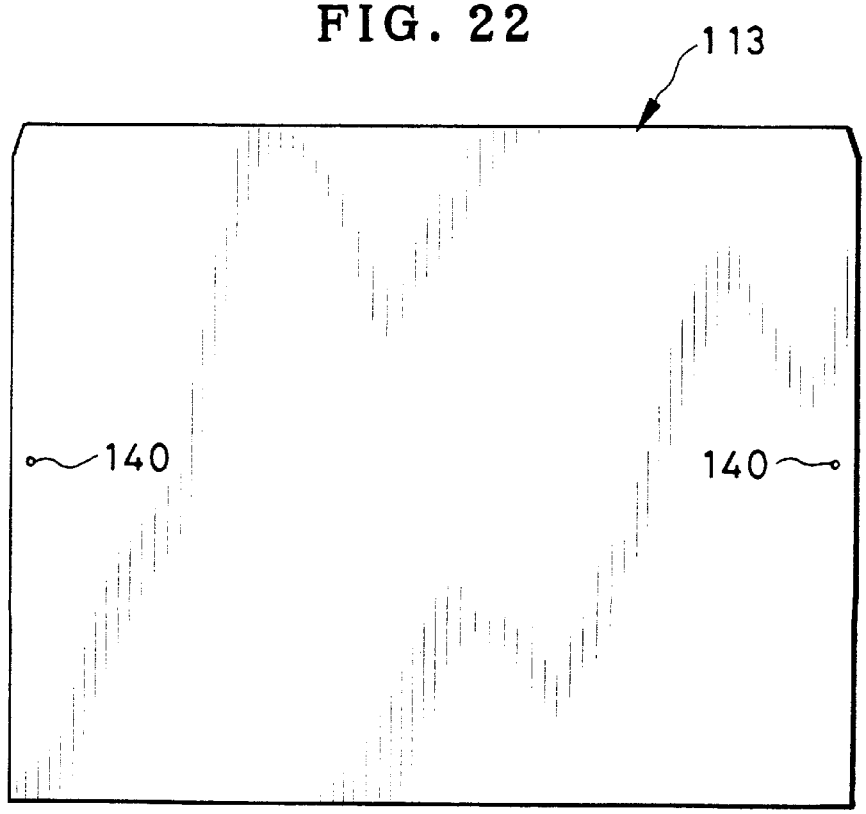
Figure 23:
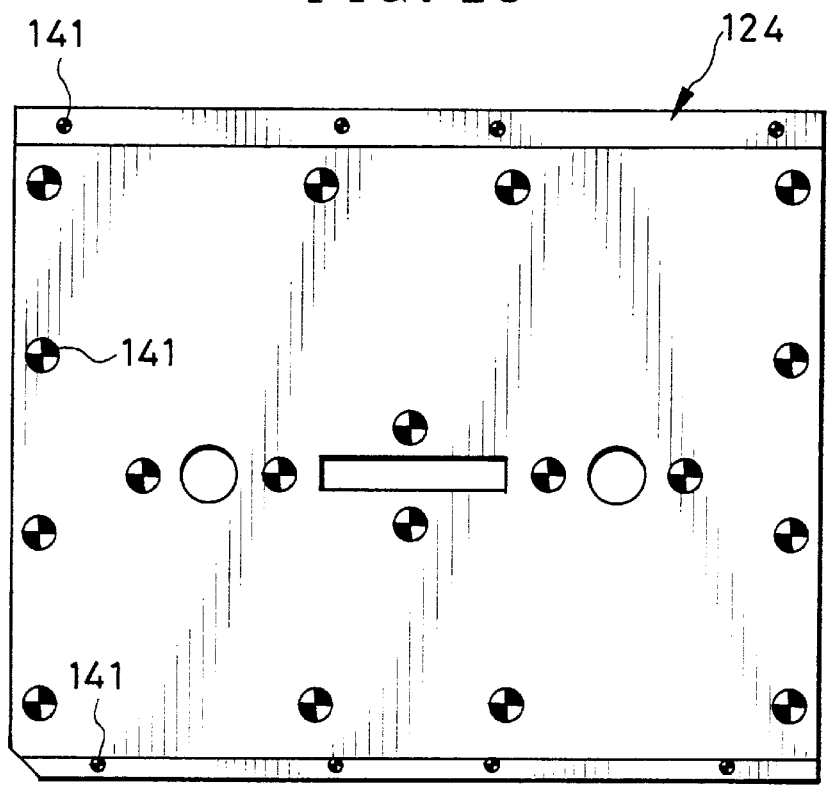
FIGS. 23 and 24 are front and rear elevations illustrating a light-shielding front reinforcer sheet.
Figure 24:
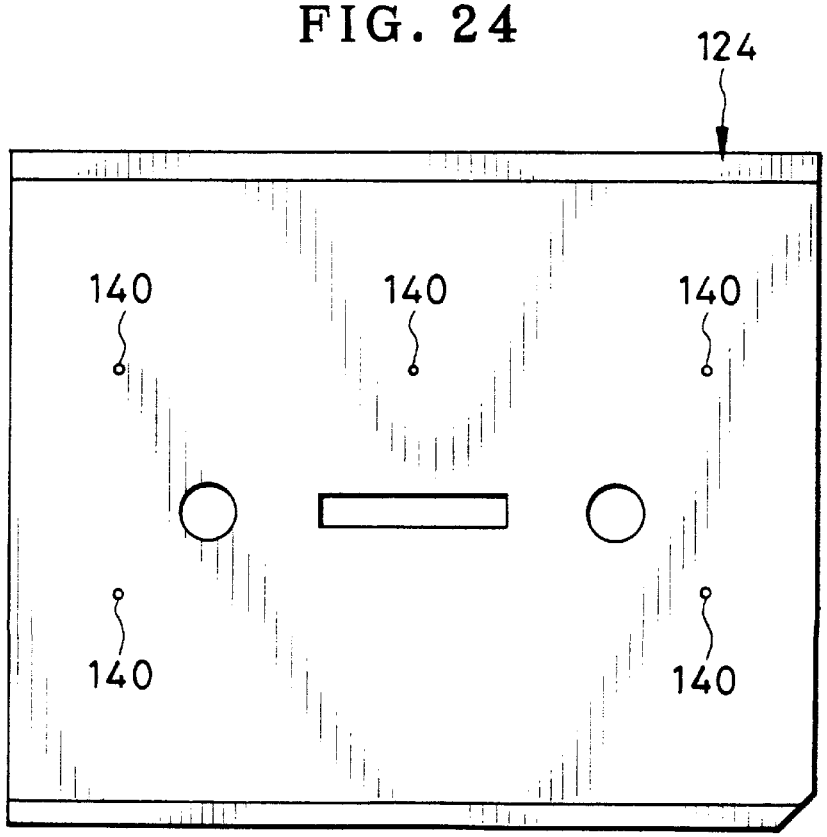
Figure 25:
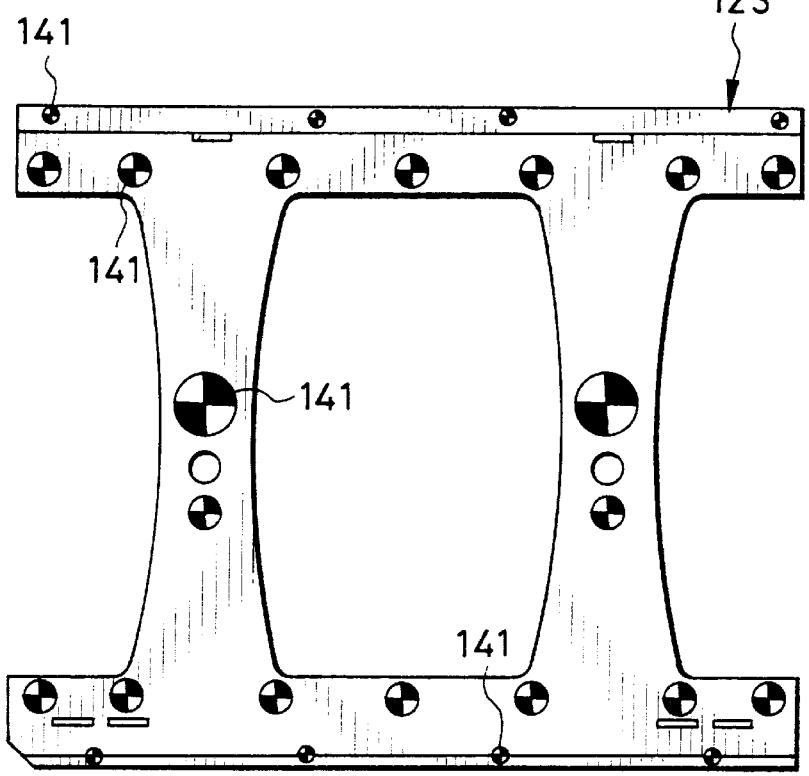
FIGS. 25 and 26 are front and rear elevations illustrating a rear light-shielding sheet.
Figure 26:
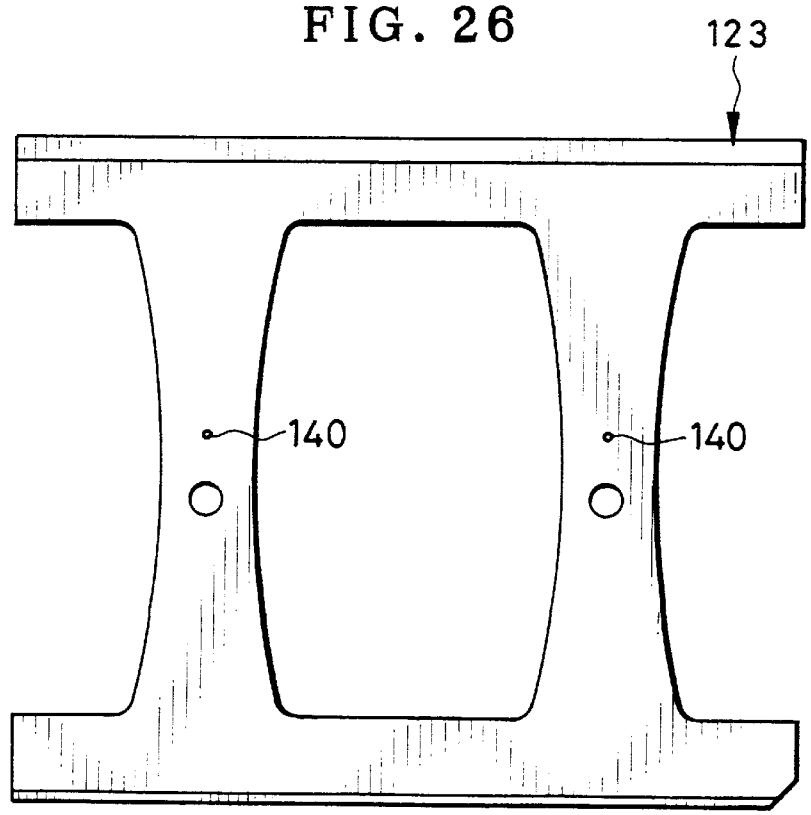
Figure 27:
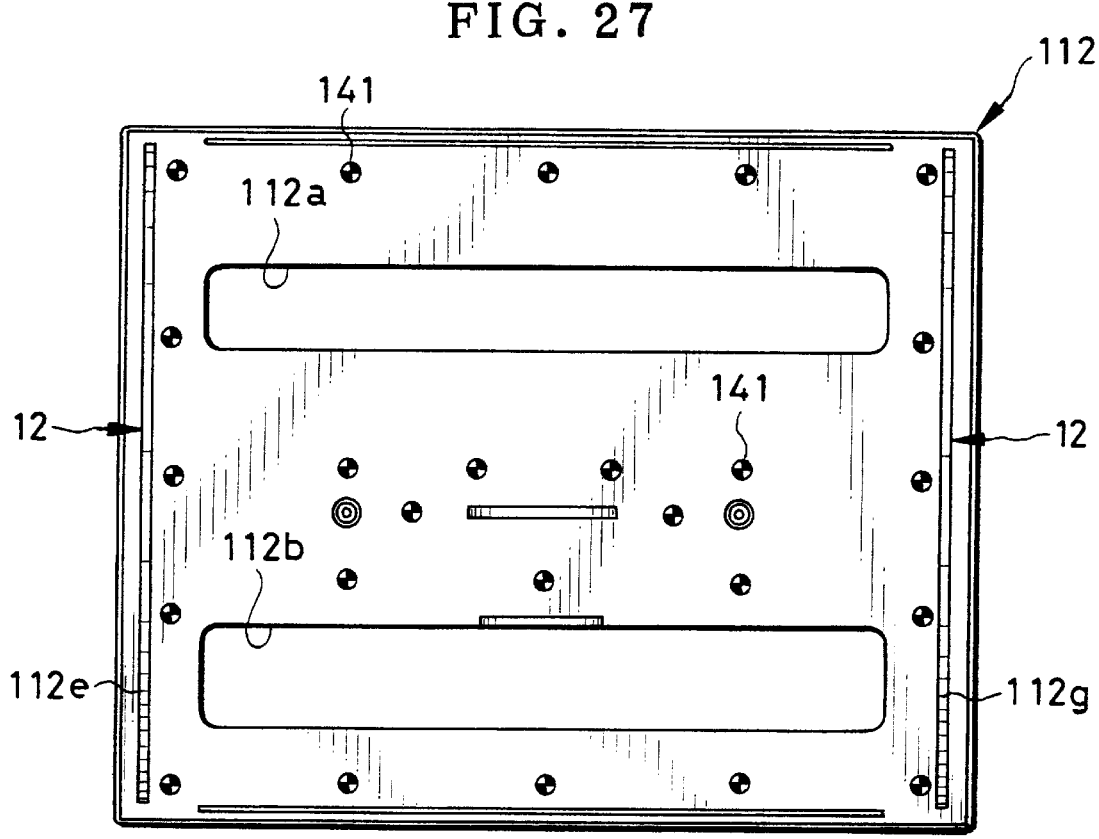
FIGS. 27 and 28 are front and rear elevations illustrating a rear plate.
Figure 28:
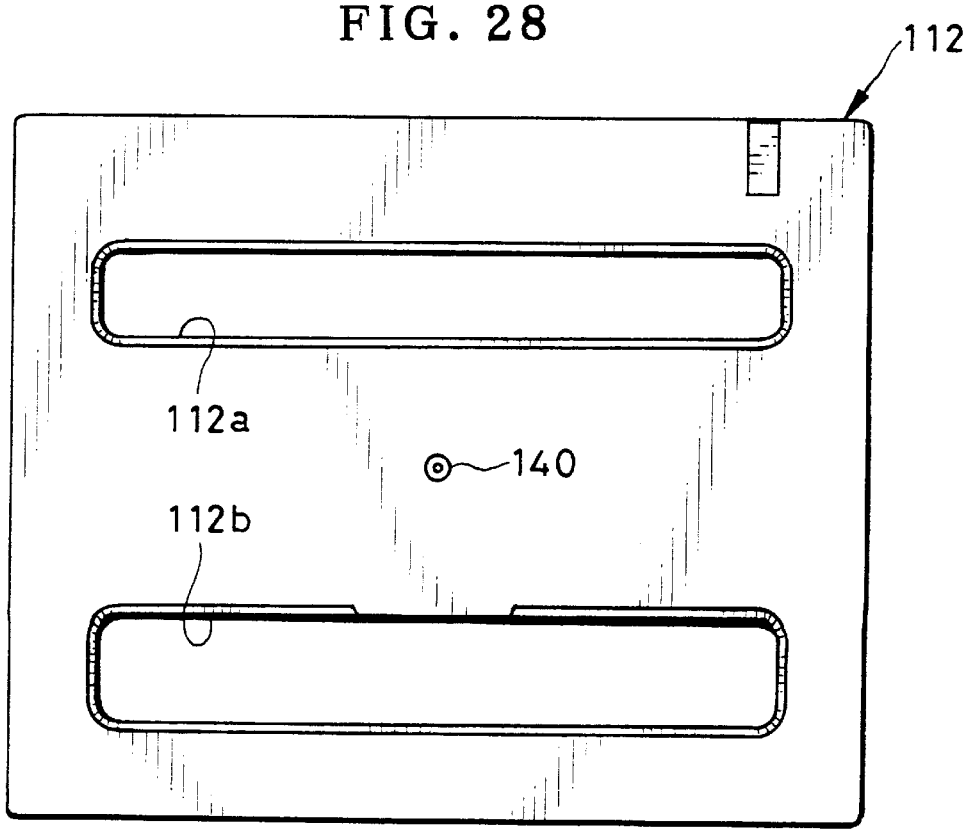

In FIG. 18, another preferred instant photo film pack 10 is depicted, in which the photo film units 114 are longer horizontally than vertically, and advanced in the direction along shorter sides. Elements similar to those of the above embodiments are designated with identical reference numerals. FIGS. 19 and 20 illustrate the pack case 111 with the gate marks 140 and the ejector pin marks 141. FIGS. 21 and 22 illustrate the cover sheet 113 with the gate marks 140 and the ejector pin marks 141. FIGS. 23 and 24 illustrate the front reinforcer sheet 124 with the gate marks 140 and the ejector pin marks 141. FIGS. 25 and 26 illustrate the rear light-shielding sheet 123 with the gate marks 140 and the ejector pin marks 141. FIGS. 27 and 28 illustrate the rear plate 112 with the gate marks 140 and the ejector pin marks 141.

Figure 29:
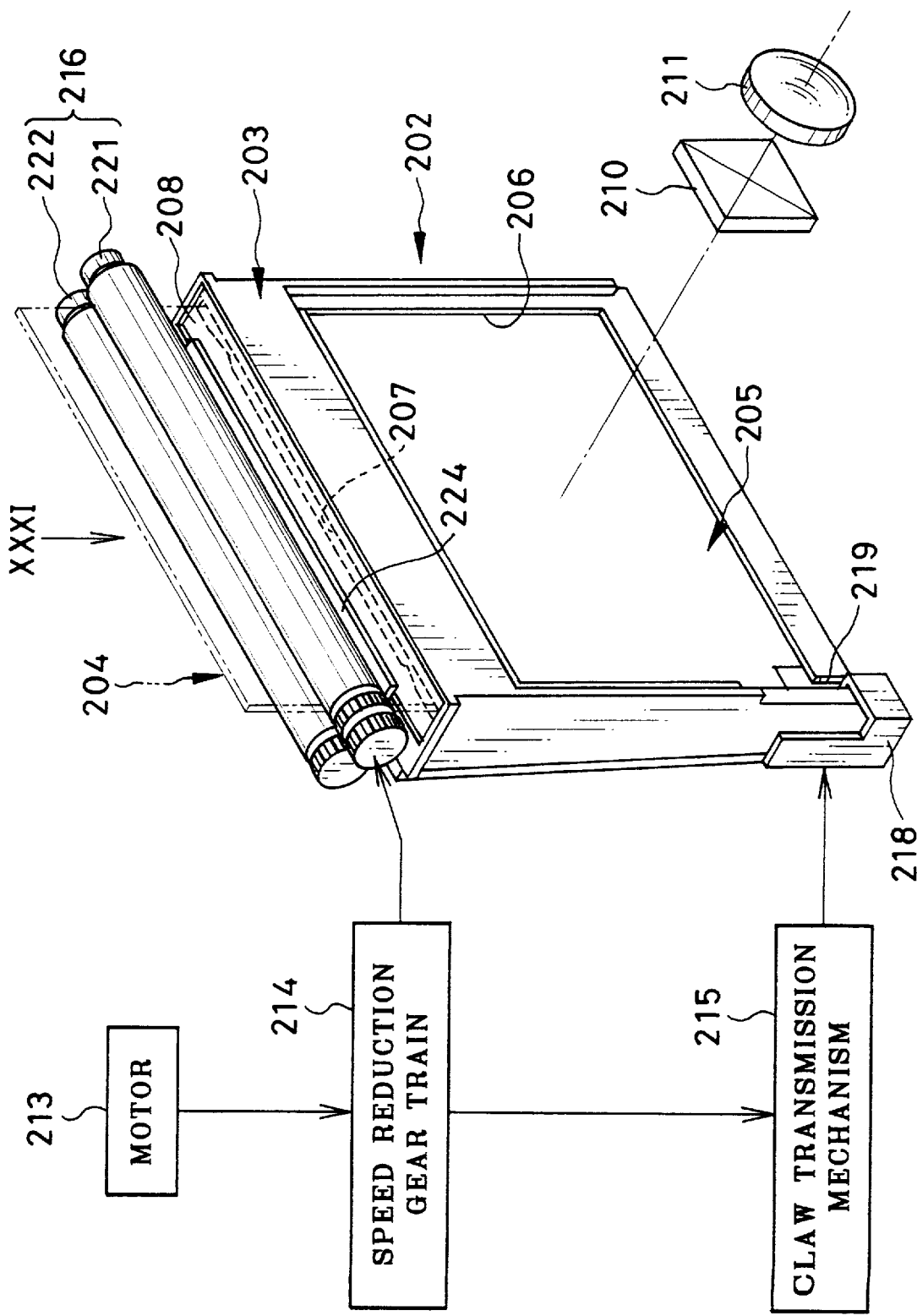
FIG. 29 is an explanatory view in a perspective and a block diagram, illustrating another preferred instant photo film pack with an improved outlet slit, together with mechanisms of a camera.

Still another preferred instant photo film pack is described now with reference to FIG. 29, in which failure is prevented in advancing operation of self-processing photo film units in an instant camera.

An instant photo film pack 202 is inserted in a photo film loading chamber in an instant camera, of which a shutter unit 210 and a taking lens 211 are positioned in front of the instant photo film pack 202. At each time when the shutter unit 210 is released, one of self-processing photo film units 204 is exposed behind an exposure opening 206. Upon the releasing operation of the shutter unit 210, an advancing mechanism for advancing one of the photo film units 204 is operated. The advancing mechanism is connected with a motor 213, and constituted by a speed reduction gear train 214, a claw transmission mechanism 215 and a spreader roller set 216. The speed reduction gear train 214 transmits rotation of the motor 213 while reducing the rotational speed. The claw transmission mechanism 215 and the spreader roller set 216 are driven upon the transmission of rotation at the speed reduction gear train 214.

A claw member 218 is driven by the claw transmission mechanism 215, which converts rotational motion of the motor 213 into vertically sliding motion.

The spreader roller set 216 is constituted by a driving roller 221 and a driven roller 222. The driving roller 221 is rotated by the speed reduction gear train 214 in the clockwise direction in the drawing. The driven roller 222 is pressed against the driving roller 221 by a bias mechanism, and caused by rotation of the driving roller 221 to rotate in direction reverse to that of the driving roller 221. The spreader roller set 216 rotates while squeezing either a over sheet 205 or one of the photo film units 204 which is pushed to advance by the claw member 218, so that the cover sheet 205 or each photo film unit 204 is moved toward the camera outlet slit. Also the spreader roller set 216 causes the photo film unit 204 to be developed while the photo film unit 204 is advanced. A spread control plate 224 is disposed between an outlet slit 207 of the instant photo film pack 202 and the spreader roller set 216, and enhances the spreading operation of the spreader roller set 216 for the processing solution of the photo film unit 204.

Figure 30:
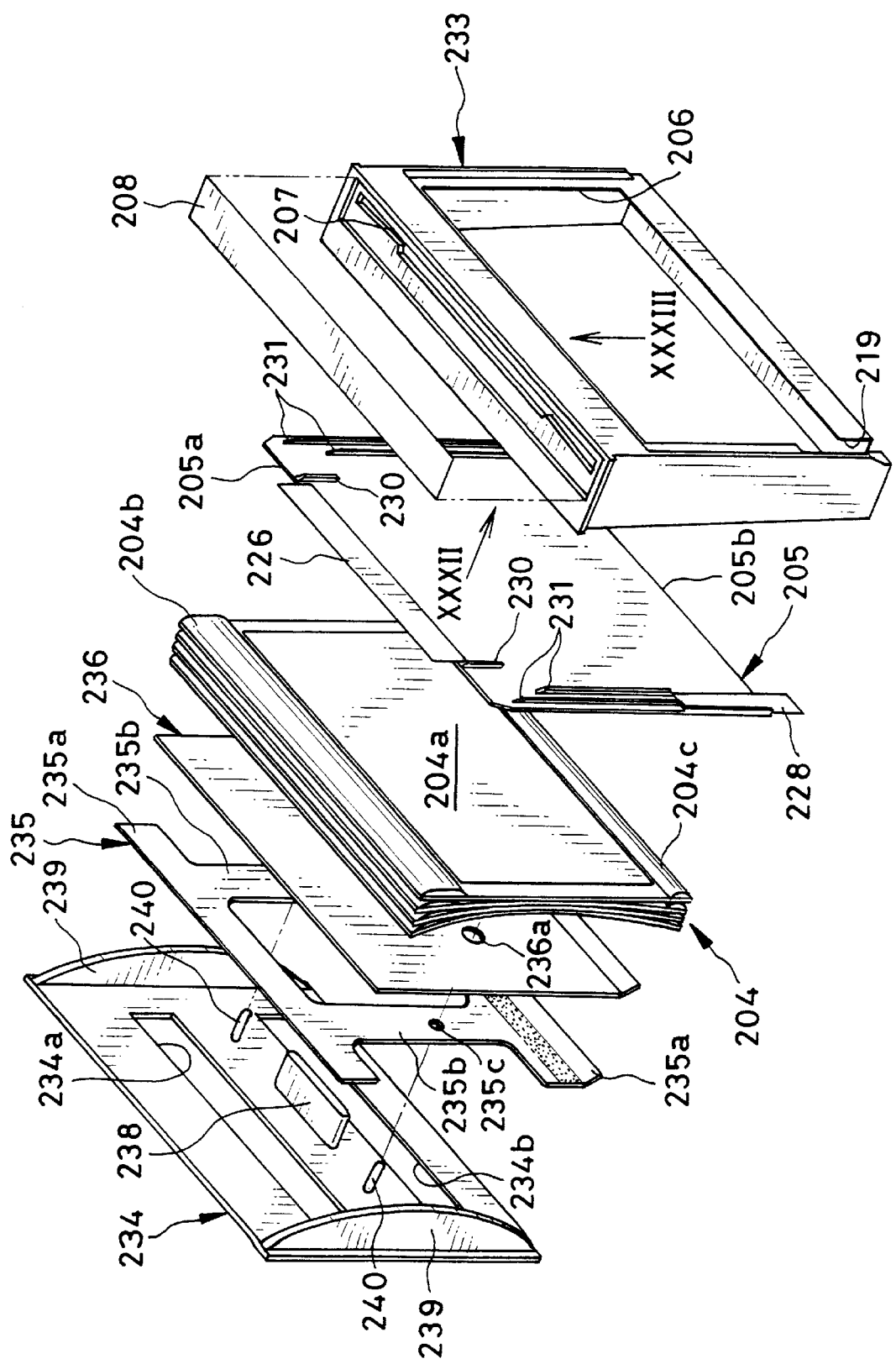
FIG. 30 is an exploded perspective illustrating the photo film pack.

In FIG. 30, the photo film units 204 are a mono-sheet type treatable as a single sheet both when unused and after a positive image is created. Also the photo film units 204 are a transmission type of which the exposure surface is different from the positive image creating surface.

The spread control plate 224 is frictionally contacted by each positive image creating surface of the photo film units 204, so as to spread the processing solution to the photosensitive layer in a uniform manner for the purpose of obtaining a print with high quality. A trap portion 204c receives the surplus part of the processing solution. The trap portion 204c accommodates a pad, which is produced from material capable of efficiently absorbing the solution.

Figure 31:
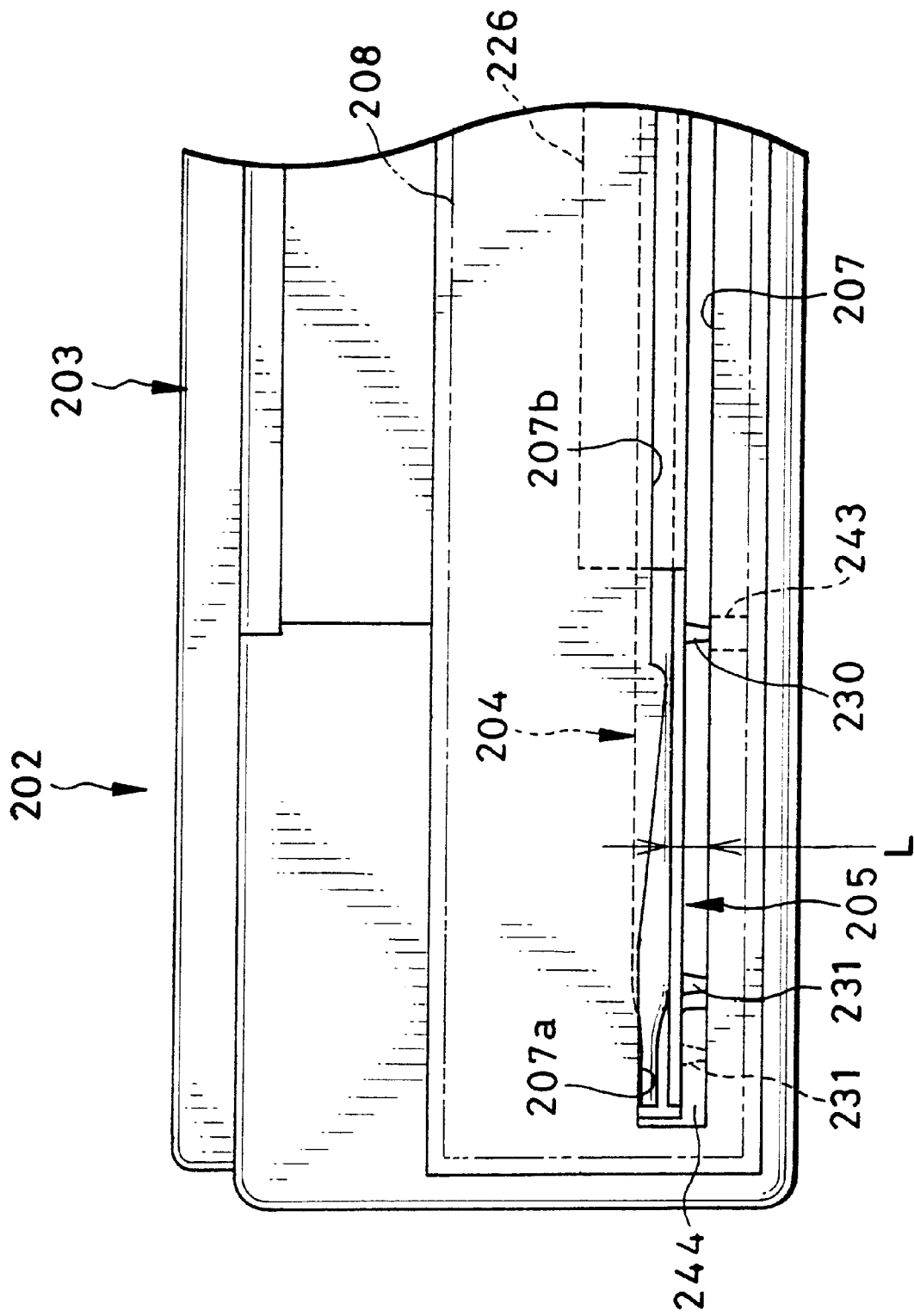
FIG. 31 is a top plan illustrating the outlet slit of the photo film pack as viewed in the direction of arrow XXXI in FIG. 29.

The cover sheet 205 is thin, and produced from plastic material with a light-shielding color. The cover sheet 205 has a smaller thickness than that of a solution pod 204*b* of the photo film units 204, and has such rigidity that it does not apply great load to the above-mentioned advancing mechanism. A top edge 205*a* of the cover sheet 205 to come into the outlet slit 207 of a pack case 203 has a top light-shielding flap 226 attached thereto. The top light-shielding flap 226 is produced from plastic sheet with a light-shielding color. In FIG. 31, the outlet slit 207 is viewed in the arrow direction XXXI in FIG. 29. The top light-shielding flap 226 is flexed toward the photo film units 204 in the pack case 203, closes the middle of the outlet slit 207, and prevents the cover sheet 205 and the photo film units 204 from slipping out of the outlet slit 207 even when the instant photo film pack 202 is dropped or shocked considerably. A corner of a bottom edge 205*b* of the cover sheet 205 is provided with a bottom light-shielding flap 228, attached thereto, for internally closing a cutout 219, which is formed to receive the claw member 218.

Two push ridges 230 are formed on the cover sheet 205, are disposed near to the top edge 205*a* and on the surface opposite to the exposure opening 206, and have such a size that the push ridges 230 do not extend to the exposure opening 206 in the pack case 203. Two light-shielding ridges 231 are formed near to each of lateral edges of the cover sheet 205. The overall shape of the instant photo film pack 202 is symmetrical except for the cutout 219 or the like.

A rear plate 234 is provided with insertion openings 234*a* and 234*b* extending horizontally. When an instant camera or printer is loaded with the instant photo film pack 202 with a door closed, pad mechanisms disposed inside the door are inserted in the insertion openings 234*a* and 234*b*. U.S. Pat. No. 5,541,683 (corresponding to JP-A 7-159932 and 7-244336) discloses examples of the pad mechanisms, which apply pressure to the rear of the stack of the photo film units 204 contained in the pack case 203, and flatten the foremost one of the photo film units 204 directly set at the exposure opening 206.

A support plate 238 and two arc-shaped support ridges 239 are disposed on the inner wall of the rear plate 234, for supporting the photo film units 204 behind the exposure opening 206, so that no space will occur between the cover sheet 205 and the exposure opening 206 even when the photo film units 204 are accidentally moved in the pack case 203.

A rear light-shielding sheet 235 and a front reinforcer sheet 236 are thin, and produced from resilient plastic material with light-shielding color. The rear light-shielding sheet 235 has a ladder shape, and includes two resilient strips 235*a* and two connector portions 235*b*. The resilient strips 235*a* are located along the insertion openings 234*a* and 234*b*, and have a flexed shape. The connector portions 235*b* connect the resilient strips 235*a* with each other. There are holes 235*c* formed in the connector portions 235*b*. Caulking pins 240 are disposed on the rear plate 234, inserted in the holes 235*c*, and caulked to secure the rear light-shielding sheet 235 to the rear plate 234. The support plate 238 is inserted in a gap defined between the resilient strips 235*a* and the connector portions 235*b*. The front reinforcer sheet 236 is laid on the rear light-shielding sheet 235, and attached to the resilient strips 235*a* at a partial region indicated by the dotted area. A slot (not shown) is formed in the front reinforcer sheet 236 for insertion of the support plate 238. Holes 236*a* are formed in the front reinforcer sheet 236 for insertion of the caulking pins 240.

In FIG. 31, the outlet slit 207 has a minimum width L defined between its front edge and two projections on the rear edge of the outlet slit 207. The outlet slit 207 has first and second recesses 207*a* and a central recess 207*b*. The first and second recesses 207*a* have a size for preventing top corners of the photo film units 204 from interfering with the inside of the outlet slit 207. The central recess 207*b* has a size for avoiding scratches on the positive image creating surface of the photo film units 204. In a direction parallel with horizontal sides of the photo film units 204, the central recess 207*b* of the outlet slit 207 has a size longer than the size of the top light-shielding flap 226 to facilitate the passage of the top light-shielding flap 226 on the top edge 205*a* of the cover sheet 205. This is effective in preventing the foremost one of the photo film units 204 from advancing to the outside of the pack case 203 while the top light-shielding flap 226 passes the outlet slit 207, because the foremost photo film unit can be kept positioned between the cover sheet 205 and the rear projections of the outlet slit 207.

Figure 32:
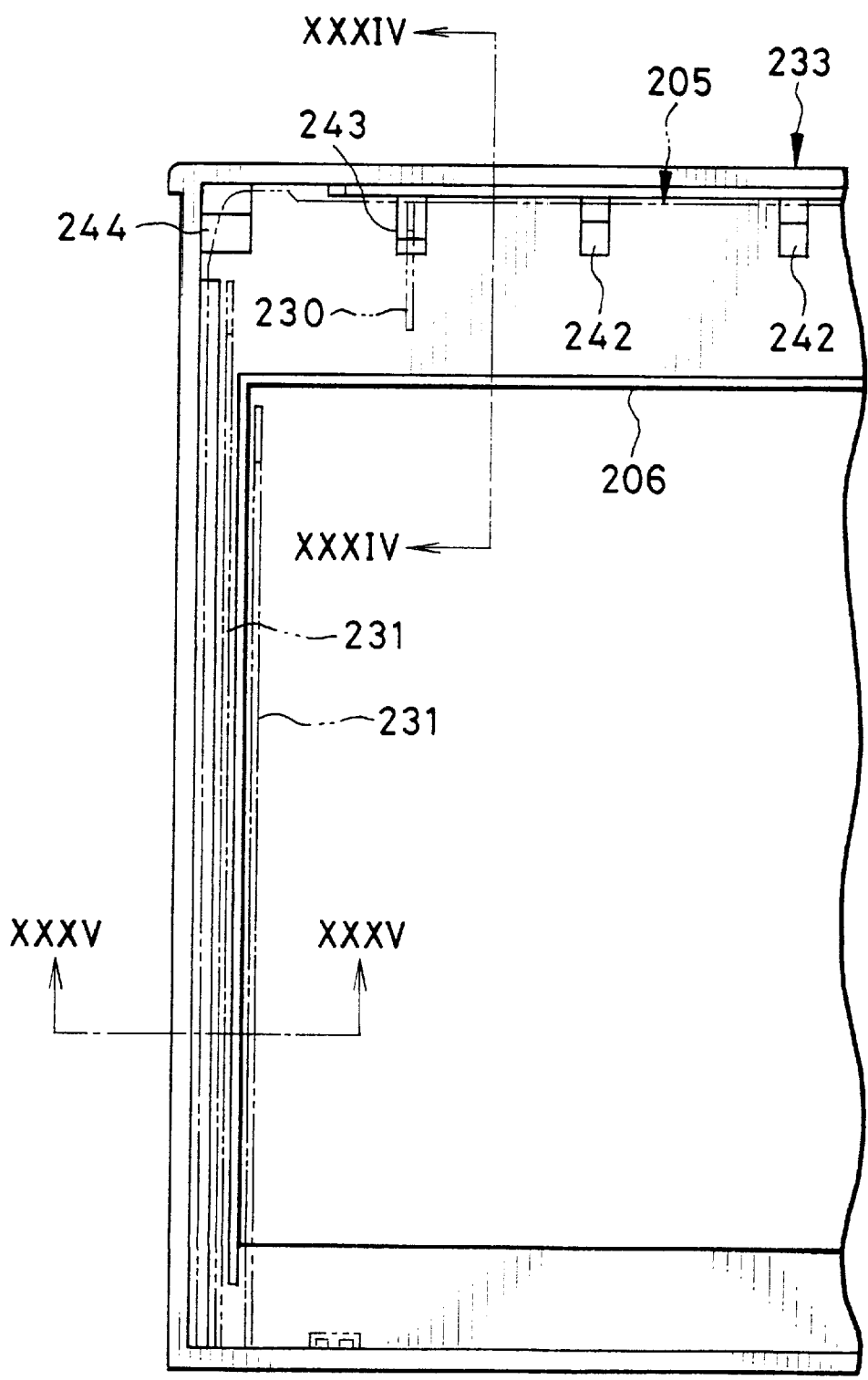
FIG. 32 is a rear elevation, partially broken, illustrating a pack case as viewed in the direction of arrow XXXII in FIG. 30.
Figure 33:
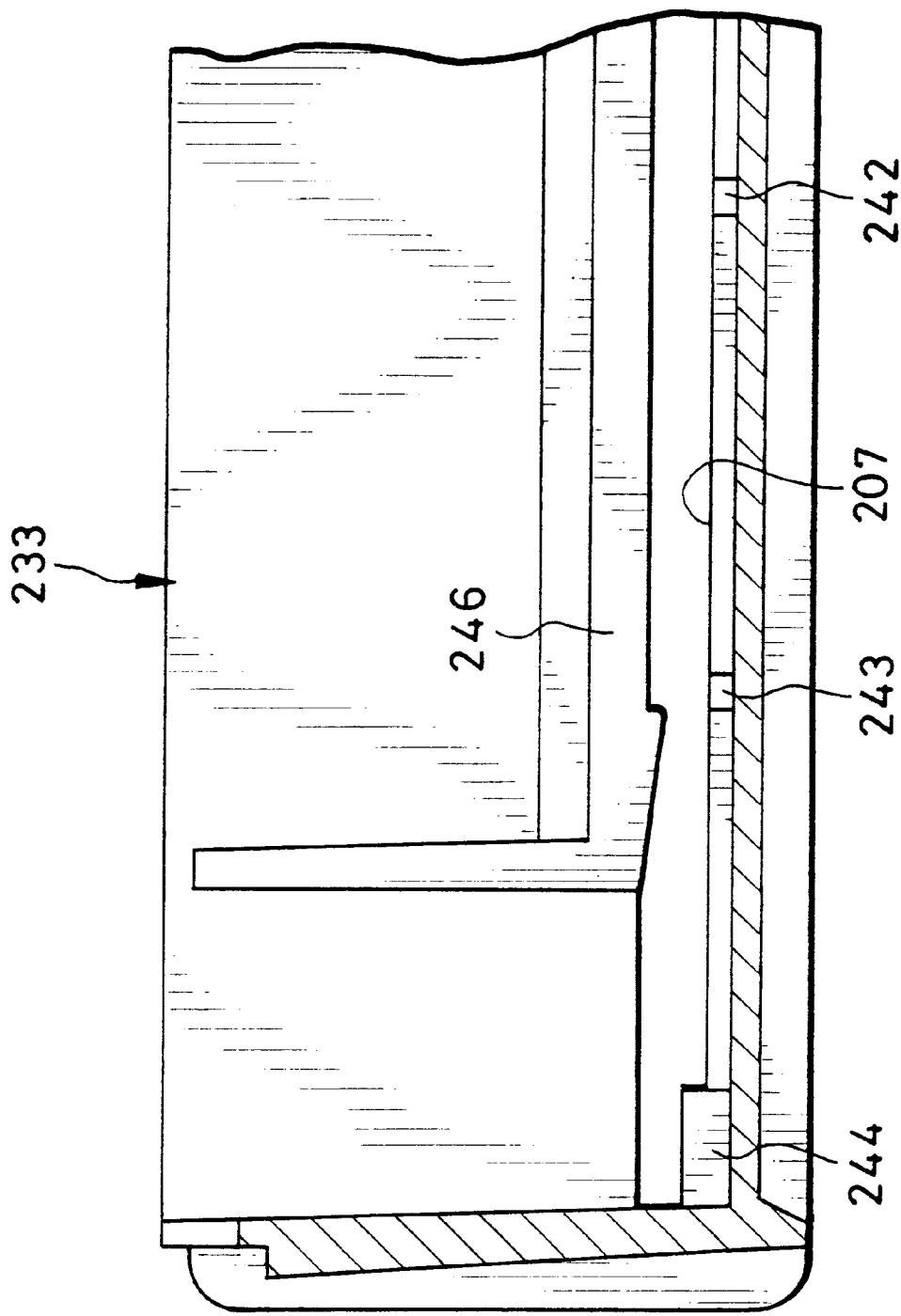
FIG. 33 is a plan, partially in section, illustrating an inner side of the outlet slit in the pack case as viewed in the direction of arrow XXXIII in FIG. 30.
Figure 34:
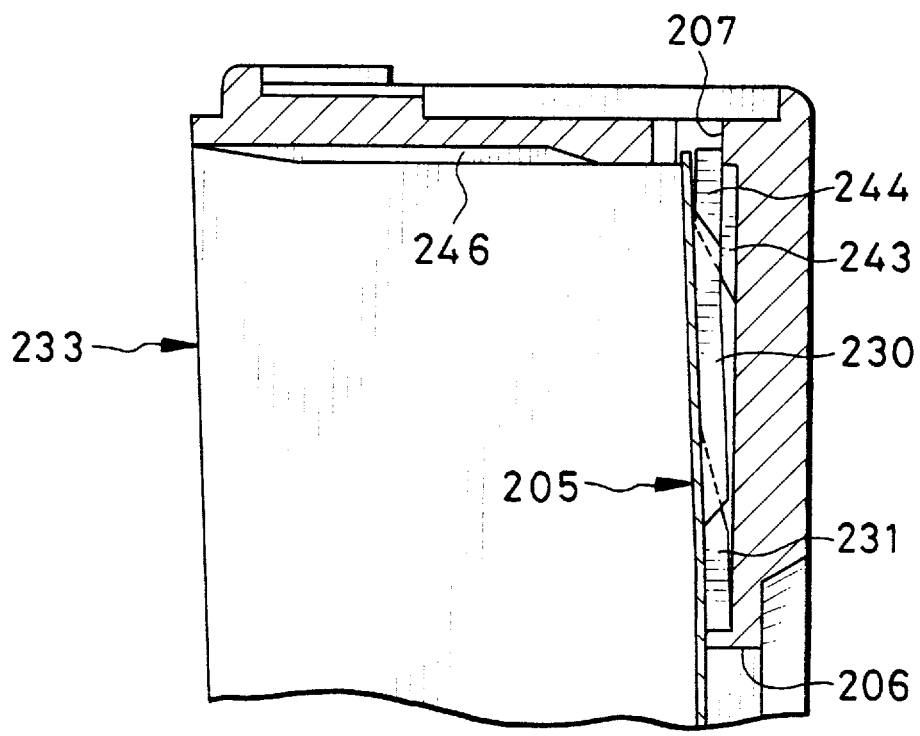
FIG. 34 is a section taken on line XXXIV—XXXIV in FIG. 32, illustrating the outlet slit and ridges extending toward it.

In FIG. 32, the outlet slit 207 in a case body 233 is viewed in the arrow direction XXXII in FIG. 30. In FIG. 33, the outlet slit 207 is viewed in the arrow direction XXXIII. Plural guide projections 242 are disposed in the case body 233 for guiding the cover sheet 205 and the photo film units 204 toward the outlet slit 207. Two push projections 243 are disposed in the case body 233, and contact the push ridges 230 of the cover sheet 205 to shift the cover sheet 205 toward the photo film units 204. First and second shifting projections 244 contact and deform corners of the cover sheet 205 and the photo film units 204. FIG. 34 illustrates a top wall of the case body 233, and is a section taken on line XXXIV—XXXIV in FIG. 32. In FIGS. 33 and 34, a guide ridge 246 is disposed in the case body 233 for guiding each of the photo film units 204 to an appropriate exposure position. Any one of the photo film units 204 is set in the exposure position upon exiting of a preceding one of the photo film units 204 from the pack case 203.

Figure 35:
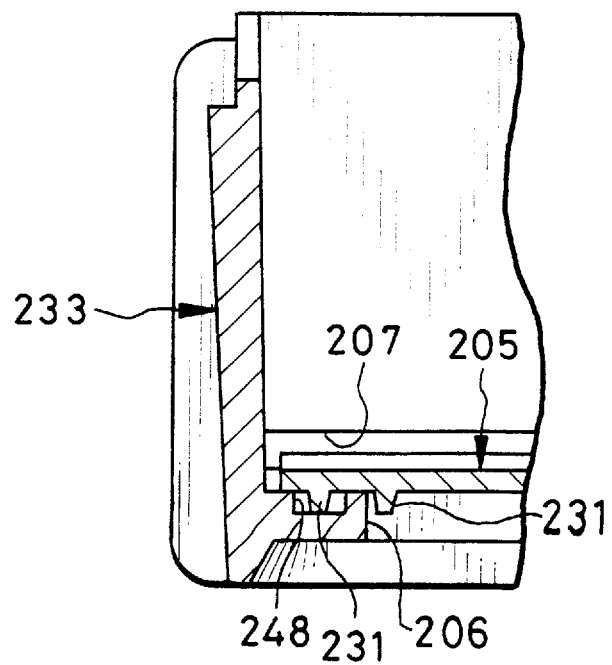
FIG. 35 is a section taken on line XXXV—XXXV in FIG. 32, illustrating ridges extending beside an exposure opening.

FIG. 35 is a section taken on line XXXV—XXXV in FIG. 32. A light-shielding groove 248 is formed in each of lateral edges of the inner wall of the case body 233 and beside the exposure opening 206. The light-shielding groove 248 receives an outer one of the light-shielding ridges 231 of the cover sheet 205 while the instant photo film pack 202 is unused, for preventing ambient light from entry into the pack case 203.

In FIGS. 31, 32 and 34, the push ridges 230 of the cover sheet 205 are contacted by the push projections 243 of the case body 233 in the vicinity of the outlet slit 207 of the instant photo film pack 202 before use. Top corners of the cover sheet 205 are contacted by the shifting projections 244. The top edge 205*a* of the cover sheet 205 is kept shifted toward the photo film units 204 as much as a height of the push ridges 230. The first one of the photo film units 204 is offset from the outlet slit 207, and is prevented from readily exiting from the outlet slit 207. If there occurs a shock to the instant photo film pack 202, the push ridges 230 and the top light-shielding flap 226 can cooperate to avoid abrupt thrust of the cover sheet 205 and the photo film units 204 out of the outlet slit 207. When the cover sheet 205 starts exiting from the pack case 203, the push ridges 230 still contact the push projections 243. The first one of the photo film units 204 still remains offset from the outlet slit 207. None of the photo film units 204 exits together with the cover sheet 205.

Figure 36:
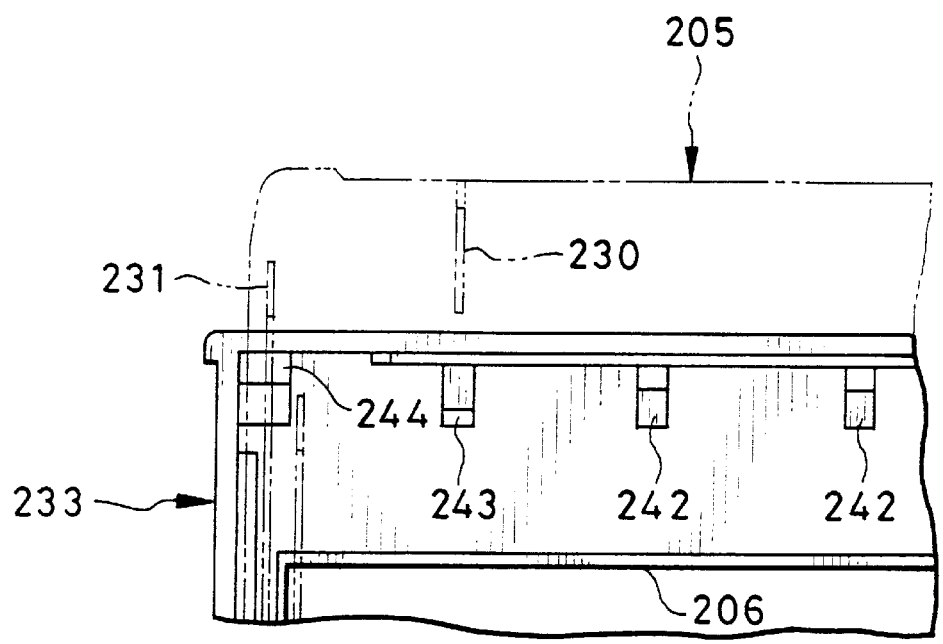
FIG. 36 is a rear elevation, partially broken, illustrating the same as FIG. 32 but in which a cover sheet is advancing.
Figure 37:
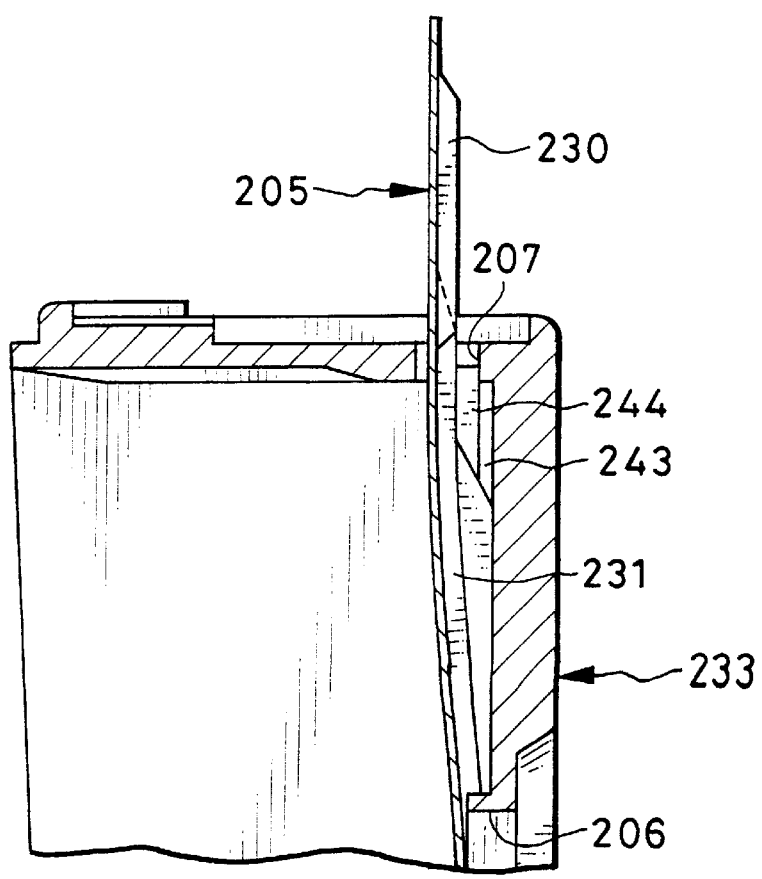
FIG. 37 is a section illustrating the same as FIG. 34 but in which the cover sheet is advancing.
Figure 38:
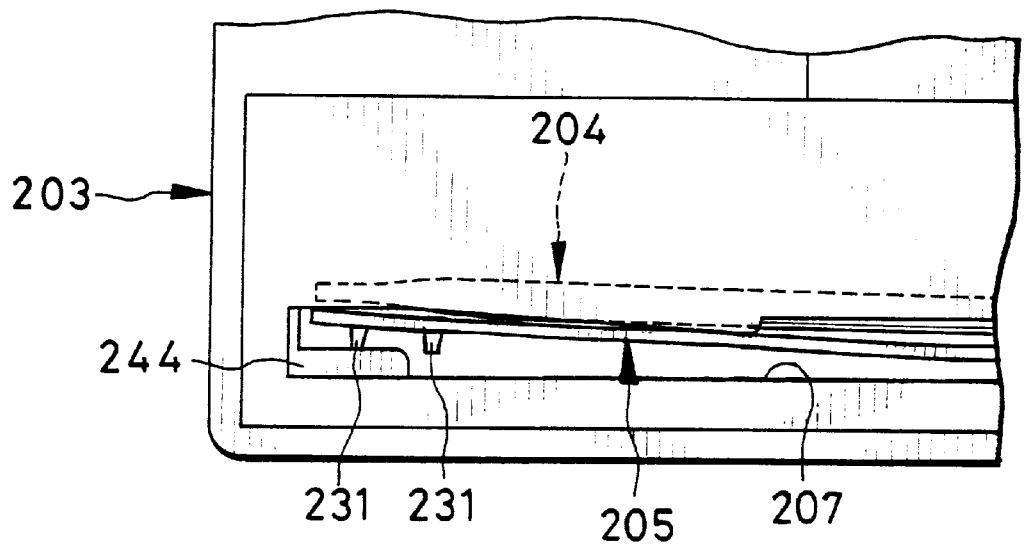
FIG. 38 is a top plan illustrating the same as FIG. 31 but in the state of FIGS. 37 and 38.

In FIGS. 36, 37 and 38, the cover sheet 205 is further moved outwards. The push ridges 230 of the cover sheet 205 are short and do not extend to the exposure opening 206 of the pack case 203. The push ridges 230 entirely exit from the outlet slit 207, and come away from the push projections 243 of the pack case 203. Shortly before the push ridges 230 come away from the push projections 243, the outer ones of the light-shielding ridges 231 come to contact the shifting projections 244, which push edges of the cover sheet 205 toward the photo film units 204. Thus, the first one of photo film units 204 is kept offset from the outlet slit 207. This is effective in preventing the first photo film unit 204 from advancing while the cover sheet 205 is advanced.

Figure 39:
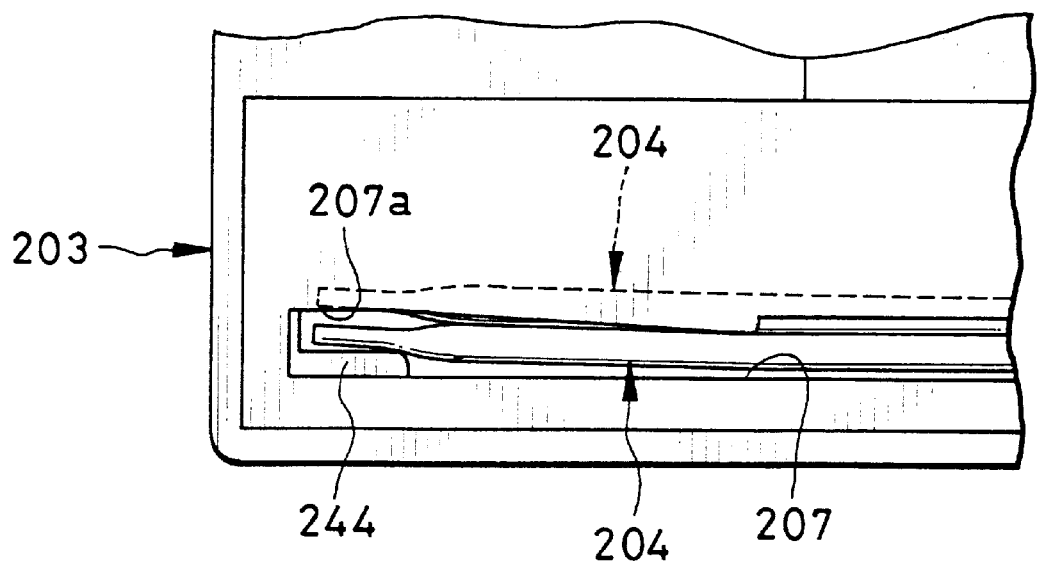
FIG. 39 is a top plan illustrating the same as FIG. 31 but in which one of photo film units is ready to exit.

In FIG. 39, the shifting projections 244 contact lateral edges of each of the photo film units 204 when the photo film units 204 are exited. The lateral edges of the photo film units 204, although likely to have an initial shape irregular between individual photo film units 204, are shifted in a regularized shape. The top corners of the photo film units 204 are kept from interfering with the outlet slit 207, to avoid failure in the advance of the photo film units 204. This is also because the first and second recesses 207a of the outlet slit 207 are formed in consideration of the shifting projections 244 and have the size enough for facilitating the advance of the photo film units 204.

The operation of the present embodiment is described now. In FIG. 29, the exposure opening 206 in the front of the pack case 203 of the instant photo film pack 202 is closed by the cover sheet 205. A light-shielding flap 208 closes the outlet slit 207.

FIGS. 32 and 34 illustrate the instant photo film pack 202 before use. The push ridges 230 on the cover sheet 205 are contacted by the push projections 243 in positions inward from the outlet slit 207. The top corners of the cover sheet 205 contact the shifting projections 244. In FIG. 31, the cover sheet 205 is kept shifted toward the photo film units 204. The first one of the photo film units 204 directly behind the cover sheet 205, therefore, remains offset from the outlet slit 207, and can be kept from passing the outlet slit 207 even shock or vibration occurs to the instant photo film pack 202. Also the top light-shielding flap 226 at the top edge 205a is disposed in the outlet slit 207, and is effective in keeping the first photo film unit 204 from exiting.

After insertion of the instant photo film pack 202 into the photo film loading chamber, a user depresses a shutter release button to release the shutter. The cover sheet 205 is advanced and ejected. Note that a camera may have such a construction that the cover sheet 205 is ejected automatically upon a closing movement of a door member of the photo film loading chamber.

The claw member 218 driven by the claw transmission mechanism 215 enters the cutout 219 in a bottom corner of the pack case 203, and pushes up the bottom edge 205b of the cover sheet 205. The cover sheet 205 is advanced up inside the pack case 203, and exited from the pack case 203 through the outlet slit 207. The cover sheet 205 is squeezed by the spreader roller set 216, and is further advanced to the camera outlet of the instant camera. Also in the course of the advance of the cover sheet 205, the push ridges 230 contact the push projections 243 of the pack case 203. The first one of the photo film units 204 is offset from the outlet slit 207, and remains separate from the cover sheet 205.

In FIGS. 36–38, the cover sheet 205 is further moved outwards. The push ridges 230 are moved out of the pack case 203. The outer ones of the light-shielding ridges 231 of the cover sheet 205 have a range overlapping the push ridges 230 as viewed horizontally. Thus the outer light-shielding ridges 231 come to contact the shifting projections 244 before the push ridges 230 come away from the push projections 243. Edges of the cover sheet 205 are pushed by the shifting projections 244 toward the photo film units 204, among which a foremost one is kept offset from the outlet slit 207.

When the cover sheet 205 is finally ejected, a first one of the photo film units 204 is pushed by the rear light-shielding sheet 235, the front reinforcer sheet 236 and the pad mechanisms to shift to the exposure opening 206. In FIG. 39, ends of the top edge of the first photo film unit 204 contact the shifting projections 244, which flex the ends in shapes ready to be exited from the outlet slit 207.

A user observes a photographic field through a viewfinder of the instant camera, and depresses the shutter release button. The shutter unit 210 is released. An exposure portion 204a of the first photo film unit 204 is exposed through the taking lens 211, to photograph a subject image.

The exposed photo film unit 204 is advanced out of the pack case 203 by the advancing mechanism. The lateral edges of the exposed photo film unit 204, although likely to have an initial shape irregular between individual photo film units, are shifted in a regularized shape. The first and second recesses 207a of the outlet slit 207 are formed in consideration of the shifting projections 244 and have the size enough for facilitating the advance of the photo film units 204. No failure in the advance occurs, as each of the photo film units 204 does not interfere with the outlet slit 207.

Figure 40:
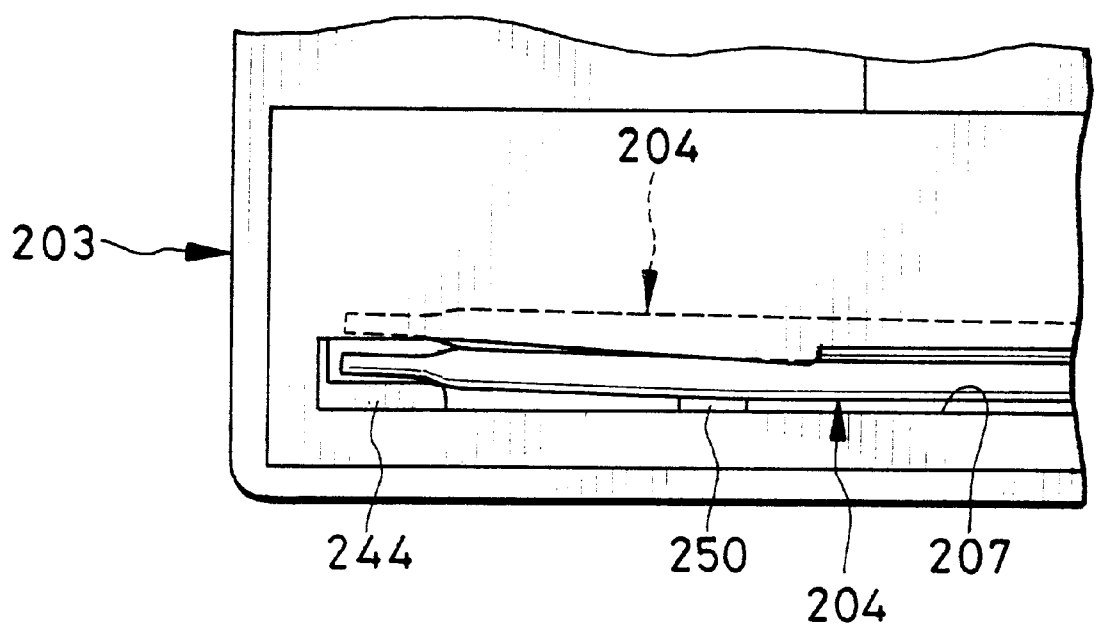
FIG. 40 is a top plan illustrating another preferred outlet slit in which push projection is disposed.

In FIG. 40, still another preferred embodiment is depicted. Push projections 250 are disposed in the vicinity of the shifting projections 244 to deform two portions along each top edge of the photo film units 204. This is effective in preventing any unexposed ones of the photo film units 204 from advancing while a preceding exposed one of the photo film units 204 is advanced.

It is to be noted that the push projections 250 are extended in an inward direction, and have an inclined surface (not shown) which guides each exposed one of the photo film units 204 in the advancing direction.

In the above embodiments, the instant camera is loaded with the instant photo film pack. Also a printer may be loaded with the instant photo film pack of the present invention. In the above embodiments, the self-processing photo film units are the transmission type of which the exposure surface is different from the positive image creating surface. However the self-processing photo film units may be a reflection type in which an exposure surface constitutes a positive image creating surface.

Also, the self-processing photo film units in the present invention may be a peel-apart type.

Furthermore, the self-processing photo film units in the present invention may have a size of the ID-1 card as defined by JIS X6301 or ISO 7810. The nominal value of this size is 85.60×53.98 mm.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An instant photo film pack comprising:

a box-shaped pack case for containing a stack of plural self-processing photo film units;

an outlet slit, formed in said pack case, for exiting an exposed one of said photo film units therethrough;

a light-shielding flap, having a substantially quadrilateral shape, for closing said outlet slit in a light-tight manner, said light-shielding flap having first and second longer side lines and first and second shorter side lines; and first, second and third predetermined adhering regions disposed on said light-shielding flap, at least said first, second and third adhering regions being coated with adhesive agent in said light-shielding flap and attached to said pack case, wherein said first adhering region extends along said first longer side line, and said second and third adhering regions have a dot shape, and are disposed respectively at said first and second shorter side lines, away from said first adhering region, and offset from an extension of said outlet slit, said outlet slit being disposed between said second and third adhering regions.

2. An instant photo film pack as defined in claim 1, wherein said adhesive agent is hot-melt adhesive agent.

3. An instant photo film pack as defined in claim 2, wherein said hot-melt adhesive agent attaches said light-shielding flap by melting in an intermittent pattern in said first adhering region.

4. An instant photo film pack comprising:

a box-shaped pack case for containing a stack of plural self-processing photo film units;

an outlet slit, formed in said pack case, for exiting an exposed one of said photo film units therethrough;

a light-shielding flap, having a substantially quadrilateral shape, for closing said outlet slit in a light-tight manner, said light-shielding flap having first and second longer side lines and first and second shorter side lines; and first, second and third predetermined adhering regions disposed on said light-shielding flap, at least said first, second and third adhering regions being coated with adhesive agent in said light-shielding flap and attached to said pack case, wherein said first adhering region extends along said first longer side line, and said second and third adhering regions are disposed respectively at said first and second shorter side lines, and offset from an extension of said outlet slit, said outlet slit being disposed between said second and third adhering regions, said first, second and third adhering regions being interconnected in such a channel shape that said outlet slit is located inside arrangement thereof.

5. An instant photo film pack as defined in claim 4, wherein said adhesive agent is hot-melt adhesive agent.

6. An instant photo film pack as defined in claim 5, wherein said hot-melt adhesive agent attaches said light-shielding flap by melting in an intermittent pattern in said first adhering region.

7. An instant photo film pack as defined in claim 4, wherein said photo film units include an exposure portion disposed substantially at a center, a processing solution pod, disposed along one of edges, for containing processing solution, and a trap portion, disposed one of said edges opposite to said solution pod with reference to said exposure portion, for trapping and hardening a surplus part of said processing solution spread on said exposure portion;

said pack case includes first and second walls;

said first wall has an exposure opening for providing said exposure portion with an exposure;

said second wall has first and second support ridges disposed to project from an inner face thereof, and extending substantially in parallel with each other;

said first and second support ridges has a support edge convexly curved at least partially, said support edge contacting a rear of said stack of said photo film units, for pushing said stack to said exposure opening; and said support edge includes a first section disposed behind said exposure portion, a second section, disposed behind said solution pod, and curved convexly toward said exposure opening, and a third section, disposed behind said trap portion to protrude toward said exposure opening beyond said second section, for preventing one of said photo film units being exited.

8. An instant photo film pack comprising:

a box-shaped pack case for containing a stack of plural self-processing photo film units in a sheet shape, said pack case having first and second walls;

an exposure opening, formed in said first wall, for providing a first one of said photo film units with an exposure therethrough;

an outlet slit, formed in an end wall of said pack case, for exiting exposed said first photo film unit therethrough;

first and second shifting projections, disposed between said exposure opening and said outlet slit to project from an inner face of said first wall, positioned close to first and second end portions of said outlet slit, for pushing and deforming first and second lateral edges of said first photo film unit; and first and second recesses, formed with said outlet slit by spreading said first and second end portions toward said second wall, for allowing passage of said first and second lateral edges deformed in said outlet slit.

9. An instant photo film pack as defined in claim 8, further comprising:

a cover sheet, disposed between said photo film units and said exposure opening, for closing said exposure opening in a light-tight manner, said cover sheet being exited through said outlet slit prior to a use of said photo film units; and at least one ridge, disposed on said cover sheet to project toward said first wall, for keeping said photo film units offset from said outlet slit by contacting said first wall, to prevent one of said photo film units directly behind said cover sheet from advancing therewith.

10. An instant photo film pack as defined in claim 9, wherein said at least one ridge is first and second ridges extending in an exiting direction of said cover sheet, and being offset from said first and second shifting projections.

11. An instant photo film pack as defined in claim 8, further comprising:

a light-shielding flap, having a substantially quadrilateral shape, for closing said outlet slit in a light-tight manner, said light-shielding flap having first and second longer side lines and first and second shorter side lines; and first, second and third predetermined adhering regions disposed on said light-shielding flap, at least said first, second and third adhering regions being coated with adhesive agent in said light-shielding flap and attached to said pack case, wherein said first adhering region extends along said first longer side line, and said second and third adhering regions are disposed respectively at said first and second shorter side lines, and offset from an extension of said outlet slit, said outlet slit being disposed between said second and third adhering regions, said first, second and third adhering regions being interconnected in such a channel shape that said outlet slit is located inside arrangement thereof.

* * * * *